United States Patent
Akavaram et al.

(10) Patent No.: US 12,373,359 B2
(45) Date of Patent: Jul. 29, 2025

(54) MECHANISM TO ENHANCE PCIE GENERATION SWITCHING

(71) Applicant: QUALCOMM Incorporated, San Diego, CA (US)

(72) Inventors: Santhosh Reddy Akavaram, Hyderabad (IN); Prakhar Srivastava, Lucknow (IN); Ravindranath Doddi, Hyderabad (IN); Rajendra Varma Pusapati, Hyderabad (IN); Sonali Jabreva, Firozabad (IN)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 18/339,904

(22) Filed: Jun. 22, 2023

(65) Prior Publication Data

US 2024/0427710 A1    Dec. 26, 2024

(51) Int. Cl.
*G06F 13/16* (2006.01)

(52) U.S. Cl.
CPC .... *G06F 13/161* (2013.01); *G06F 2213/0026* (2013.01)

(58) Field of Classification Search
CPC .............. G06F 13/161; G06F 2213/0026
See application file for complete search history.

(56) References Cited

U.S. PATENT DOCUMENTS

| 2008/0022024 | A1* | 1/2008 | Mao ............... H04L 41/0896 710/104 |
| 2014/0082251 | A1 | 3/2014 | Li |
| 2016/0267041 | A1 | 9/2016 | Jose et al. |
| 2020/0341927 | A1* | 10/2020 | Luong ............. G06F 13/4027 |
| 2020/0371579 | A1* | 11/2020 | Selvam ............. G06F 1/3278 |
| 2021/0041929 | A1* | 2/2021 | Connor ............. G06F 1/3209 |

OTHER PUBLICATIONS

International Search Report and Written Opinion—PCT/US2024/027945—ISA/EPO—Jul. 9, 2024.

* cited by examiner

*Primary Examiner* — Zachary K Huson
(74) *Attorney, Agent, or Firm* — Muncy, Geissler, Olds & Lowe, P.C./QUALCOMM

(57) ABSTRACT

Various embodiments include methods and devices for implementing a Peripheral Component Interconnect Express (PCIe) link configuration by a computing device. Embodiments may include selecting, by a PCIe device, a predetermined PCIe link speed based on a PCIe link configuration mode of a PCIe system of a plurality of PCIe link configuration modes of the PCIe system, and selecting, by the PCIe device, a PCIe link width of one lane for configuring the PCIe link. Embodiments may include selecting a PCIe link speed level lower than a current PCIe link speed in response to a reliability indicator exceeding a reliability threshold for a first PCIe link configuration mode. Embodiments may include selecting a maximum PCIe link speed for the PCIe link for a second PCIe link configuration mode. Embodiments may include increasing the PCIe link width in response to a requested bandwidth exceeding a configuration bandwidth of the PCIe link.

30 Claims, 12 Drawing Sheets

MECHANISM TO ENHANCE PCIE GENERATION SWITCHING

BACKGROUND

The Peripheral Component Interconnect Express (PCIe) standard provides a mechanism to manage bandwidth offered by a PCIe link based on a host or endpoint data rate requirement. Bandwidth management for the PCIe link is variably implemented by software at the host or endpoint by changing either a PCIe generation (gen)/version speed or a PCIe link width for the currently operational PCIe link. Software designers are responsible for optimizing the PCIe link configuration, including bandwidth management, resulting in PCIe link performance that is specific to individual software implementations. Design choices for PCIe link configuration of individual software implementations can result in PCIe link reliability issues and/or excess power consumption.

SUMMARY

Various aspects provide methods include methods and apparatuses for implementing such methods for a Peripheral Component Interconnect Express (PCIe) device of a computing device to select a PCIe link configuration. Various aspects may include selecting a predetermined PCIe link speed as a PCIe link speed for configuring a PCIe link based on a PCIe link configuration mode of a PCIe system of a plurality of PCIe link configuration modes of the PCIe system, in which the plurality of PCIe link configuration modes includes at least a first PCIe link configuration mode and a second PCIe link configuration mode, and selecting a PCIe link width of one lane for configuring the PCIe link.

In some aspects, the PCIe link configuration mode is the first PCIe link configuration mode, and the aspects may further include comparing a reliability indicator of a lane of the PCIe link with a reliability threshold, in which selecting the predetermined PCIe link speed includes selecting a PCIe link speed level lower than a current PCIe link speed for the PCIe link in response to the reliability indicator of the lane of the PCIe link exceeding the reliability threshold.

In some aspects, the PCIe link configuration mode is the first PCIe link configuration mode, and the aspects may further include comparing a requested bandwidth and a configuration bandwidth of the PCIe link, and increasing the PCIe link width in response to the requested bandwidth exceeding the configuration bandwidth of the PCIe link.

Some aspects may further include comparing the PCIe link width with a PCIe link width threshold, in which increasing the PCIe link width in response to the requested bandwidth exceeding the configuration bandwidth of the PCIe link may include increasing the PCIe link width in response to the requested bandwidth exceeding the configuration bandwidth of the PCIe link and the PCIe link width falling short of the PCIe link width threshold.

In some aspects, the PCIe link configuration mode is the second PCIe link configuration mode, and selecting the predetermined PCIe link speed may include selecting a maximum PCIe link speed for the PCIe link.

In some aspects, the PCIe link configuration mode is the second PCIe link configuration mode, and the aspects may further include comparing a requested bandwidth and a configuration bandwidth of the PCIe link, and increasing the PCIe link width in response to the requested bandwidth exceeding the configuration bandwidth of the PCIe link.

In some aspects, the PCIe link configuration mode is the second PCIe link configuration mode, and the aspects may further include comparing a requested bandwidth and a configuration bandwidth of the PCIe link, and decreasing the PCIe link speed in response to the configuration bandwidth of the PCIe link exceeding the requested bandwidth.

Some aspects may further include interpreting the PCIe link configuration mode, in response to interpreting the PCIe link configuration mode as the first PCIe link configuration mode, modifying a current PCIe link configuration having a current PCIe link width and a current PCIe link speed by increasing the PCIe link width relative to the current PCIe link width in response to a requested bandwidth exceeding a current bandwidth and decreasing the predetermined PCIe link speed relative to the current PCIe link speed in response to the current bandwidth exceeding the requested bandwidth, and in response to interpreting the PCIe link configuration mode as the second PCIe link configuration mode, modifying the current PCIe link configuration by increasing the predetermined PCIe link speed relative to the current PCIe link speed in response to the requested bandwidth exceeding the current bandwidth and decreasing the PCIe link width relative to the current PCIe link width in response to the current bandwidth exceeding the requested bandwidth.

Further aspects include a computing device including a memory and a Peripheral Component Interconnect Express (PCIe) controller configured to perform operations of any of the methods summarized above. Further aspects include a non-transitory processor-readable storage medium having stored thereon processor-executable software instructions configured to cause a processor to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
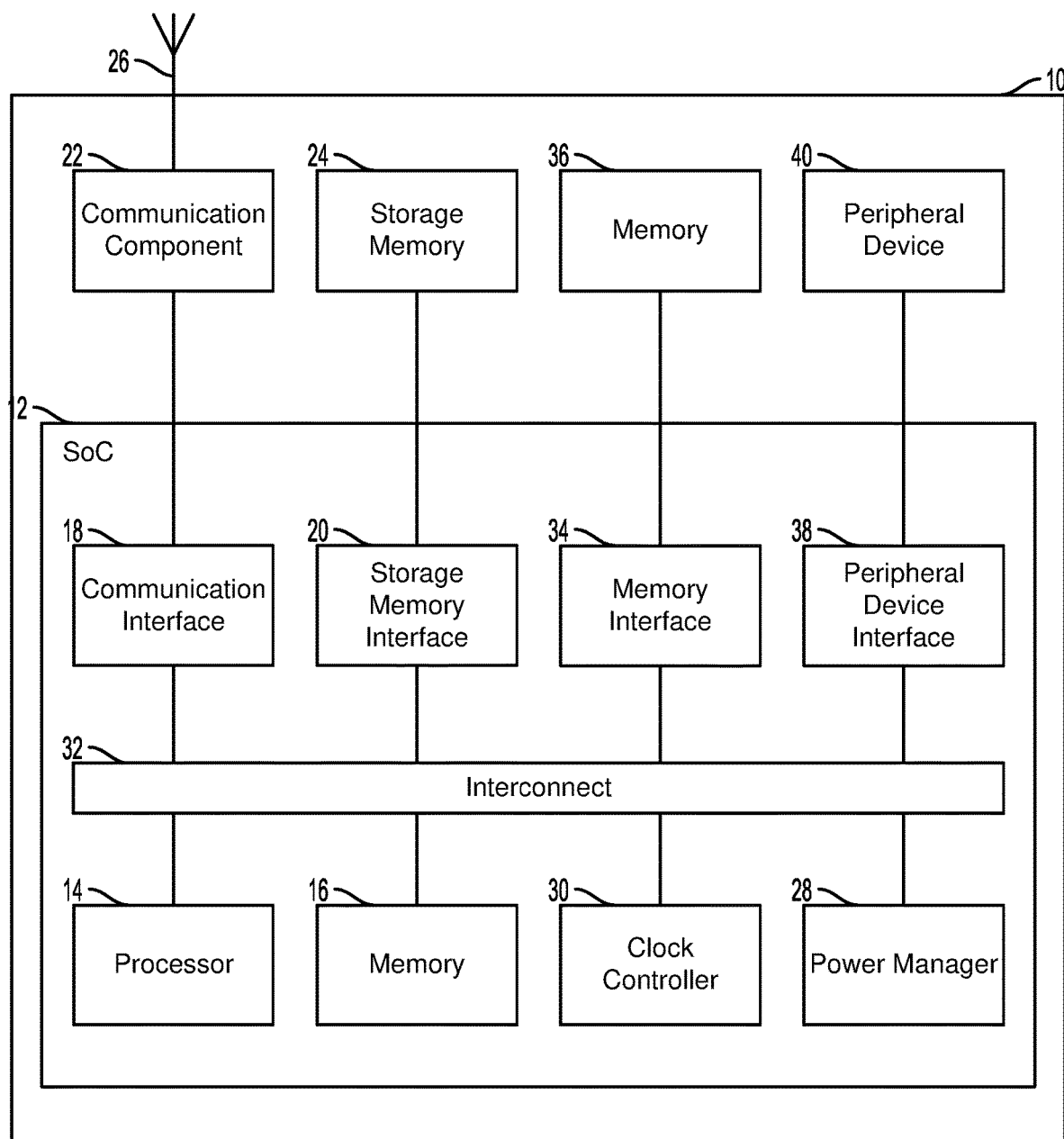
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of implementing Peripheral Component Interconnect Express (PCIe) link configuration. Embodiments may include selecting, by a PCIe device, a predetermined PCIe link speed, and selecting, by the PCIe device, a PCIe link width of one lane for configuring the PCIe link. Embodiments may include selecting the predetermined PCIe link speed based on a PCIe link configuration mode of a PCIe system from multiple PCIe link configuration modes of the PCIe system. For example, the PCIe link speed for a PCIe link reliability mode may be one level lower than a current PCIe link speed. As another example, the PCIe link speed for a PCIe link power mode may be a maximum PCIe link speed for the PCIe link. Embodiments may include adjusting the PCIe link width based on comparing a requested bandwidth and a configuration bandwidth of the PCIe link. Embodiments may include adjusting the PCIe link speed based on comparing the requested bandwidth and the configuration bandwidth of the PCIe link.

The term "computing device" is used herein to refer to stationary computing devices including personal computers, desktop computers, all-in-one computers, workstations, super computers, mainframe computers, embedded computers (such as in vehicles and other larger systems), computing systems within or configured for use in vehicles, servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of code, e.g., processor-executable instructions, for ease and clarity of explanation, but may be similarly applicable to any data, e.g., code, program data, or other information stored in memory. The terms "code", "data", and "information" are used interchangeably herein and are not intended to limit the scope of the claims and descriptions to the types of code, data, or information used as examples in describing various embodiments.

The PCIe standard provides a mechanism to manage bandwidth offered by a PCIe link based on a host or endpoint data rate requirement. Bandwidth management for the PCIe link is variably implemented by software at the host or endpoint by changing either a PCIe generation (gen)/version speed or a PCIe link width for the currently operational PCIe link. Software designers are responsible for optimizing the PCIe link configuration, including bandwidth management, resulting in PCIe link performance that is specific to individual software implementations. Design choices for PCIe link configuration of individual software implementations can result in PCIe link reliability issues and/or excess power consumption.

Design choices for PCIe link configurations of individual software implementations generally configure a PCIe link for a desired software implementation. However, the design choices for the PCIe link configuration can be limited based on the lack of availability of information or lack of consideration of external factors affecting PCIe link performance in varying circumstances. Designing PCIe link configurations for implementations where the external factors are variable adds complexity that is difficult to account for at the design and manufacturing stage.

For example, the temperature of the environment in which a PCIe link is implemented and the gen speed of the PCIe link can affect the reliability of the PCIe link, with increasing temperatures and gen speeds correlating with decreasing reliability. Example applications of PCIe links in which environmental temperature and PCIe link gen speed can be factors include automotive applications due to engine heat and cell site modems in hot climates.

As another example, the frequency of operation of the PCIe link can affect the reliability of the PCIe link, with increasing frequency of operation correlating with decreasing reliability. Some examples of decreasing reliability include increasing bit error rates, electromagnetic interference, loss of PCIe link, and other channel losses. Computing systems used or embedded in vehicles (e.g., automobiles) is an example applications of PCIe links in which link reliability is important but link reliability issues have been observed, such as increased bit error rates with increased frequency of operations.

As another example, applications in which power availability is limited, the gen speed of the PCIe link and a width of the PCIe link, correlating to a number of lanes used for the PCIe link, can affect the power consumption of the PCIe link, with increasing gen speeds and/or link widths correlating with increasing power consumption. Some examples of applications of PCIe links in applications in which power availability is limited may include computing devices with limited power reserves, such as a battery, or inconsistent power supply, such as renewable energy sources.

Various embodiments address and overcome the foregoing problems related to PCIe link configuration by providing real-time, flexible PCIe link configuration via a PCIe device configured for adjusting PCIe link gen speed and/or PCIe link width based on PCIe link configuration modes configured for reliability of the PCIe link and/or power consumption of the PCIe link. The PCIe link configuration mode may be preset and/or set in real-time at the PCIe device. Based on the PCIe link configuration mode, the PCIe device may adjust PCIe link gen speed and/or PCIe link width in response to various factors, thereby preserving or improving PCIe link bandwidth and/or PCIe link reliability.

The PCIe link configuration mode may be set so as to prioritize reliability of the PCIe link and/or power consumption of the PCIe link. For example, for PCIe link applications in environments that expose a PCIe link system to temperatures detrimental to the PCIe link reliability, some embodiments may prioritize reliability and set the PCIe link configuration to a reliability PCIe link configuration mode. The PCIe device, informed by the reliability PCIe link configuration mode, may be prompted to configure the PCIe link for greater PCIe link reliability than a current PCIe link configuration. The prompt may be based on a measure of the PCIe link reliability compared with a PCIe link reliability threshold indicating the PCIe link is less reliable than PCIe link reliability threshold. The PCIe device may select a predetermined PCIe link speed and/or a predetermined PCIe link width. For example, the PCIe device may select a PCIe link speed that is of a lower (i.e., slower) speed than a current PCIe link speed of the current PCIe link configuration. PCIe link speed may be a contributing factor to reduction of PCIe link reliability in temperatures detrimental to the PCIe link reliability. Lowering the PCIe link speed may mitigate at least some of the reduction of the PCIe link reliability. The PCIe device may select a PCIe link width of one lane.

The PCIe device may further adjust the PCIe link width based on a comparison of a PCIe link configuration bandwidth and a requested bandwidth from a host and/or endpoint of the PCIe system. Selecting the PCIe link speed and/or the PCIe link width may result in the PCIe link configuration bandwidth being insufficient to achieve the requested bandwidth. In response to the requested bandwidth exceeding the PCIe link configuration bandwidth, the PCIe device may increase the PCIe link width by increasing the number of lanes used in order to achieve the requested bandwidth using the lower speed PCIe link speed.

As another example, for PCIe link applications where in which availability is limited, the PCIe link configuration mode may be set to a power PCIe link configuration mode. The PCIe device, informed by the power PCIe link configuration mode, may be prompted to configure the PCIe link for lower PCIe link power consumption than a current PCIe link configuration. The PCIe device may select a predetermined PCIe link speed and/or a predetermined PCIe link width. For example, the PCIe device may select a maximum PCIe link speed and/or the PCIe device may select a PCIe link width of one lane. The combination of PCIe link speed and PCIe link width may be a contributing factor to reduction of PCIe link power consumption in applications where power availability is limited. A combination of a greater PCIe link speed and a lower PCIe link width may consume less power while enabling the PCIe link to provide a same bandwidth than a combination of a lower PCIe link speed and a greater PCIe link width.

The PCIe device may further adjust the PCIe link width and/or the PCIe link speed based on a comparison of a PCIe link configuration bandwidth and a requested bandwidth from a host and/or endpoint of the PCIe system. The selected PCIe link speed and/or PCIe link width may result in the PCIe link configuration bandwidth not achieving the requested bandwidth. To achieve the requested bandwidth using the selected PCIe link speed, the PCIe device may increase the PCIe link width by increasing the number of lanes used in response to the requested bandwidth exceeding the PCIe link configuration bandwidth. As another example, to achieve the requested bandwidth using the selected PCIe link width, the PCIe device may decrease the PCIe link speed in response to the PCIe link configuration bandwidth exceeding the requested bandwidth.

Various embodiments improve the operations and reliability of computing systems using PCIe links by configuring links with effective link-width and link-speed combinations to accommodate changes in operating frequency and temperature. Various embodiments may be particularly useful in computing systems embedded in vehicles, such as automobiles, due to the high temperature and severe environmental conditions often experienced by vehicle systems.

FIG. 1 illustrates a system including a computing device 10 suitable for use with various embodiments. With reference to FIG. 1, the computing device 10 may include a system-on-chip (SoC) 12 with a processor 14, a memory 16, a communication interface 18, a storage memory interface 20, a memory interface 34, a power manager 28, a clock controller 30, a peripheral device interface 38, and an interconnect 32. The computing device 10 may further include a communication component 22, such as a wired or wireless modem, a storage memory 24, an antenna 26 for establishing a wireless communication link, a memory 36, and a peripheral device 40. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16, 36 of the SoC 12 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM) and/or dynamic RAM (DRAM), or cache memory. These memories 16, 36 may be configured to temporarily hold a limited amount of data received from a data sensor or subsystem, data and/or processor-executable code instructions that are requested from a non-volatile memory 16, 24, loaded to the memories 16 from the non-volatile memory 16, 24 in anticipation of future access based on a variety of factors, and/or intermediary processing data and/or processor-executable code instructions produced by the processor 14 and temporarily stored for future quick access without being stored in non-volatile memory 16, 24. The memory interface 34 and the memory 36 may work in unison to allow the computing device 10 to load and retrieve data and processor-executable code on the memory 36.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The power manager 28 may be configured to control power states of one or more power rails (not shown) for power delivery to the components of the SoC 12. In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. The power manager 28 may be configured as a power management integrated circuit (power management ICs or PMIC).

A clock controller 30 may be configured to control clock signals transmitted to the components of the SoC 12. For example, the clock controller 30 may gate a component of the SoC 12 by disconnecting the component of the SoC 12 from a clock signal and may ungate the component of the SoC 12 by connecting the component of the SoC 12 to the clock signal.

A peripheral device interface 38 may enable components of the SoC 12, such as the processor 14 and/or the memory 16, to communicate with a peripheral device 40. The peripheral device interface 38 may provide and mange physical and logical connections between the components of the SoC 12 and the peripheral device 40. The peripheral device interface 38 may also manage communication between the components of the SoC 12 and the peripheral device 40, such as by directing and/or allowing communications between transmitter and receiver pairs of the components of the SoC 12 and the peripheral device 40 for a communication. The communications may include transmission of memory access commands, addresses, data, interrupt signals, state signals, etc. A peripheral device 40 may be any component of the computing device 10 separate from the SoC 12, such as a processor, a memory, a subsystem, etc. In some embodiments, the peripheral device interface 38 may include a PCIe root complex and may enable PCIe protocol communication between the components of the SoC 12 and the peripheral device 40.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Figure 2:
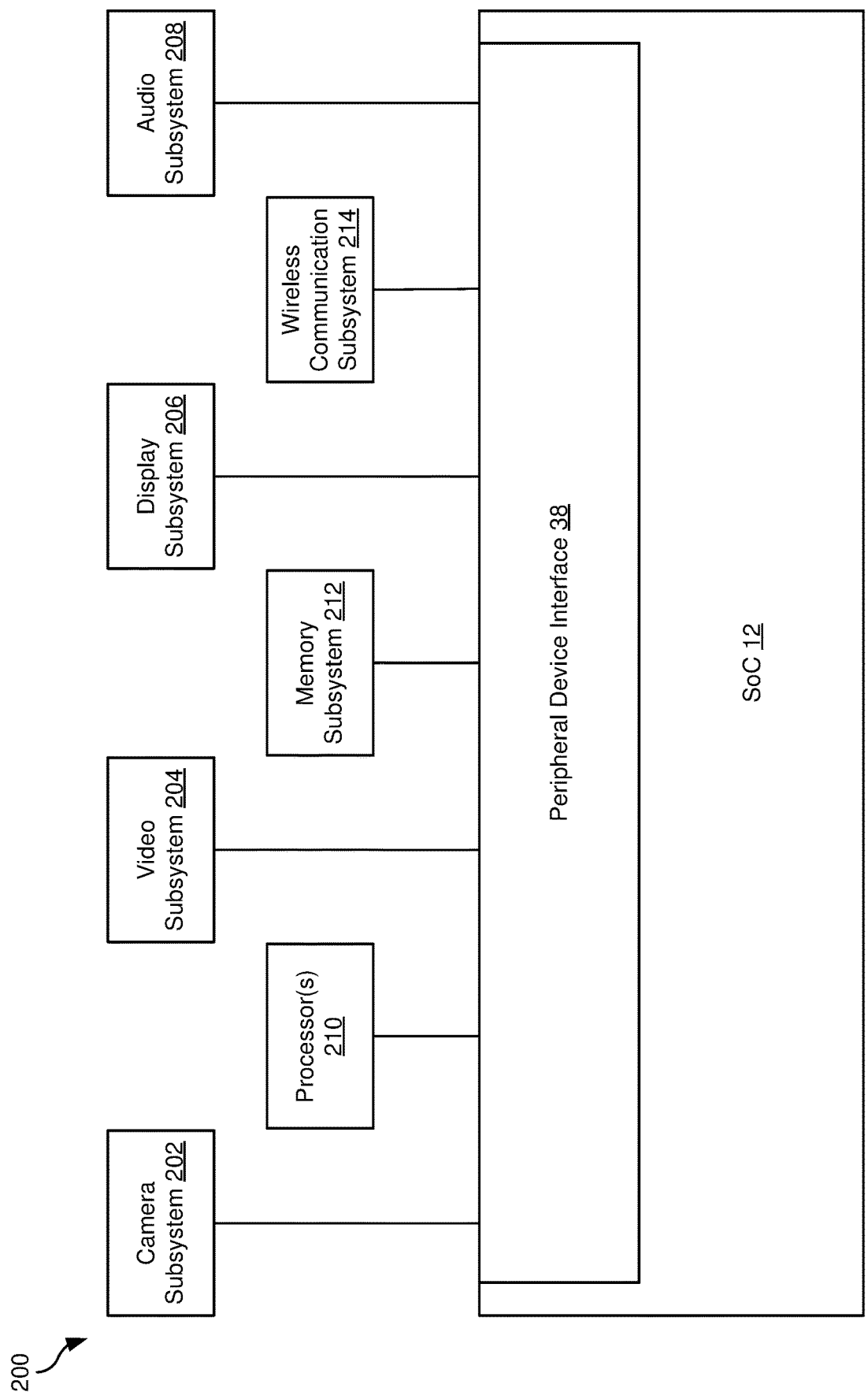
FIG. 2 is a component block diagram illustrating an example peripheral device system suitable for implementing various embodiments.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device FIG. 2 illustrates an example peripheral device system 200 suitable for implementing various embodiments. With reference to FIGS. 1 and 2, the peripheral device system 200 may include any number and combination of peripheral devices 202, 204, 206, 208, 210, 212, 214 (e.g., peripheral device 40) communicatively connected to one or more peripheral device interfaces 38 of an SoC 12.

A peripheral device interface 38 may communicatively connect one or more peripheral devices 202, 204, 206, 208, 210, 212, 214 with one or more components of the SoC 12 as described, including a processor (e.g., processor 14) and/or a memory (e.g., memory 16). The processor may include any number and combination of CPUs, GPUs, DSPs, APUs, SPUs etc. The memory may include any number and combination of system caches, random access memories (RAM), registers, FLASH, EPROM, etc. Communicatively connecting a peripheral device 202, 204, 206, 208, 210, 212, 214 with a component of the SoC 12 via the peripheral device interface 38 may enable transmission of communications between the peripheral device 202, 204, 206, 208, 210, 212, 214 and the component of the SoC 12. Such communications may include memory access commands, addresses, data, interrupt signals, state signals, etc. In some examples, the peripheral device interface 38 may be a PCIe root complex of a PCIe system and enable PCIe protocol communication between the components of the SoC 12 and the one or more peripheral devices 202, 204, 206, 208, 210, 212, 214.

In some embodiments, the peripheral device may include one or more processors 210 (e.g., processor 14), such as a processor or processor cluster separate from the SoC 12. For example, a processor 210 may include any number and combination of CPUs, GPUs, DSPs, APUs, SPUs etc. In some embodiments, the peripheral device may include various peripheral device subsystems (e.g., communication component 22, storage memory 24, memory 36, peripheral device 40) having one or more processors (e.g., processor 14) and memories (e.g., memory 16, 24, 36), such as camera, video, display, audio, memory, and wireless communication subsystems 202, 204, 206, 208, 212, 214. A processor may include any number and combination of CPUs, GPUs, DSPs, APUs, SPUs etc. A memory may include any number and combination of caches, RAM, registers, FLASH, EPROM, etc. In some embodiments, the peripheral device 202, 204, 206, 208, 210, 212, 214 may include any number and combination of sensors, receivers, transmitters, controllers, and dedicated memories, such as caches and memory registers, configured for controlling and implementing functionalities of the peripheral device 202, 204, 206, 208, 210, 212, 214. In some examples, the peripheral device 202, 204, 206, 208, 210, 212, 214 may include and/or be connected to a PCIe system endpoint (not shown) configured to enable PCIe protocol communication between the peripheral device 202, 204, 206, 208, 210, 212, 214 and one or more components of the SoC 12.

The descriptions of the peripheral devices 202, 204, 206, 208, 210, 212, 214 illustrated in FIG. 2 are only meant to be examples and in no way limiting. Several of the components of the illustrated example peripheral devices 202, 204, 206, 208, 210, 212, 214 may be variably configured, combined, and separated. Several of the peripheral devices 202, 204, 206, 208, 210, 212, 214 may be included in greater or fewer numbers and may be located and connected differently than illustrated.

Figure 3:
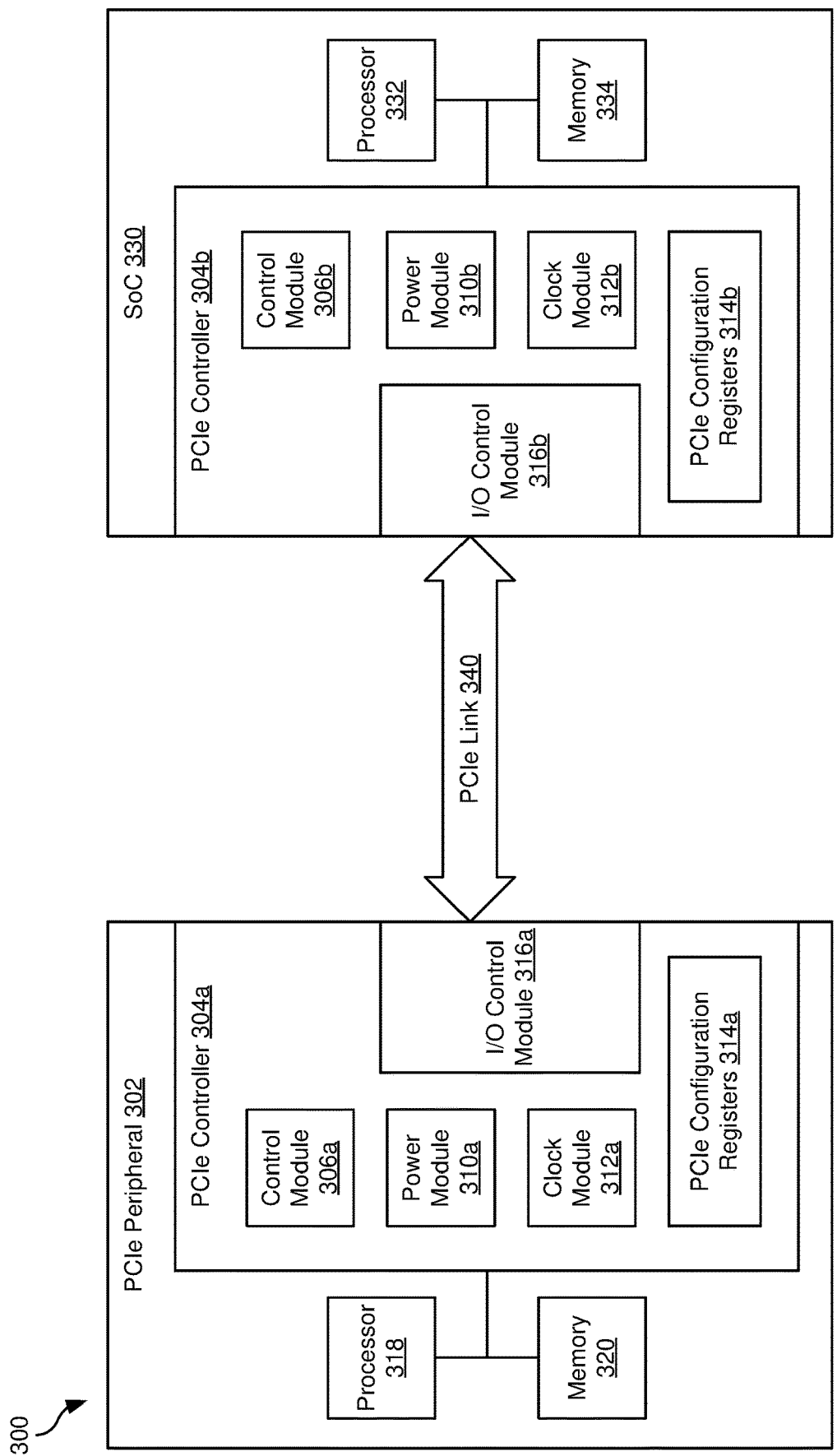
FIG. 3 is a component block diagram illustrating an example Peripheral Component Interconnect Express (PCIe) system suitable for implementing various embodiments.

FIG. 3 illustrates an example PCIe system 300 suitable for implementing various embodiments. With reference to FIGS. 1-3 the PCIe system 300 may include at least a pair of PCIe enabled devices 302, 330 of a computing device (e.g., computing device 10) configured to communicate with each other via PCIe protocol. A pair of PCIe enabled devices 302, 330 may include, for example, a PCIe peripheral 302 (e.g., peripheral device 40, 202, 204, 206, 208, 210, 212, 214) and an SoC 330 (e.g., SoC 12). The PCIe peripheral 302 may be any peripheral device of the computing device configured to communicate with another component of the computing device via PCIe protocol.

The pair of PCIe enabled devices 302, 330 may include any combination of hardware, software, firmware, etc. configured for enabling communication between the pair of PCIe enabled devices 302, 330 via PCIe protocol. For example, each pair of PCIe enabled devices 302, 330 may include a PCIe controller 304a, 304b (e.g., peripheral device interface 38 in FIGS. 1 and 2) configured to enable communication via PCIe protocol. The PCIe controller 304a may be and/or may be part of a peripheral component interconnect device that is a PCIe endpoint and the PCIe controller 304 may be and/or may be a PCIe device that is a PCIe root complex In some embodiments, each PCIe enabled device 302, 330 may include a processor 318, 332 (e.g., processor 14, 210) and a memory 320, 334 (e.g., memory 16, 24, 36, and/or memory subsystem 212). In some embodiments, the PCIe controller 304a, 304b may be communicatively connected to the processor 318, 332 and/or the memory 320, 334 of the PCIe enabled device 302, 330 with which the PCIe controller 304a, 304b is associated.

A PCIe controller 304a, 304b may include a control module 306a, 306b, an input/output (I/O) control module 316a, 316b, and PCIe configuration registers 314a, 314b. In some embodiments, the PCIe controller 304a, 304b may also include a power module 310a, 310b and/or a clock module 321a, 312b. A control module 306a, 306b may be configured to control various functions of the PCIe controller 304a, 304b. Such functions may include enumeration of the PCIe enabled devices 302, 330 in the PCIe system 300, PCIe link 340 configuration between PCIe enabled devices 302, 330, communication functions for communicating between PCIe enabled devices 302, 330 and between the PCIe enabled devices 302, 330 and the processor 318, 332 and/or the memory 320, 334 of the PCIe enabled device 302, 330 with which the PCIe controller 304a, 304b is associated, etc.

PCIe configuration registers 314a, 314b may be configured to store data relating to the configuration of the PCIe link 340. For example, the PCIe configuration registers 314a, 314b may store data detailing the configuration of the PCIe link 340, including PCIe link configuration mode data.

In some examples, the PCIe link configuration mode data may indicate to the PCIe controller 304a, 304b to implement a PCIe link reliability mode, a PCIe link power mode, a PCIe link default mode or no PCIe link mode, etc.

The PCIe controller 304a, 304b implementing the PCIe link reliability mode may implement a PCIe link configuration process configured to configure the PCIe link 340 with increased reliability compared to a current PCIe link configuration, which may include a default PCIe link configuration. The PCIe controller 304a, 304b implementing the PCIe link power mode may implement a PCIe link configuration process configured to configure the PCIe 304 with lower power consumption compared to a current PCIe link configuration, which may include the default PCIe link configuration. The PCIe controller 304a, 304b implementing the PCIe link default mode or no PCIe link mode may implement a PCIe link configuration process configured to configure the PCIe link 340 according to default PCIe link configuration parameters and/or PCIe link configuration parameters provided by software executed at the PCIe enabled device 302, 330. The PCIe controller 304a, 304b may retrieve the PCIe link configuration mode data from the PCIe configuration registers 314a, 314b and implement the PCIe link configuration process according to the corresponding PCIe link configuration mode in a configuration state ("configuration") of a link training status and state machine (LTSSM) 400, illustrated in FIG. 4 with reference to FIGS. 1-4, implemented by the PCIe controller 304a, 304b.

The PCIe link configuration mode data may be loaded to the PCIe configuration registers 314a, 314b at boot time and/or at run time. The PCIe link configuration mode data may be loaded to the PCIe configuration registers 314a, 314b at boot time by a developer/manufacture that chose the PCIe link configuration mode data based on an application of the PCIe system 300. For example, a developer/manufacturer may set the PCIe link configuration mode data to indicate the PCIe link reliability mode for a PCIe system application in environments exposing a PCIe link system to temperatures detrimental to the PCIe link reliability. As another example, a developer/manufacturer may set the PCIe link configuration mode data to indicate the PCIe link power mode for a PCIe system application with limited and/or inconsistent power supply. The PCIe link configuration mode data may be loaded to the PCIe configuration registers 314a, 314b at run time by software executed at the PCIe enabled device 302, 330.

An I/O control module 316a, 316b may be configured to generate, transmit, and/or receive PCIe communications and signals via the PCIe link 340 established between the pair of PCIe enabled devices 302, 330. The communications and signals may include memory access commands, addresses, data, interrupt signals, state signals, etc. generated, transmitted, and/or received by the I/O control module 316a, 316b. For example, the I/O control module 316a, 316b may generate, transmit, and/or receive instructions via the communications and/or signals to set the PCIe link configuration mode data at the PCIe configuration registers 314a, 314b. For example, an instruction may be for the PCIe controller 304a, 304b to set the PCIe link configuration mode data at the PCIe configuration registers 314a, 314b to indicate the PCIe link reliability mode, the PCIe link power mode, the PCIe link default mode or no PCIe link mode, etc.

A clock module 312a, 312b may provide clock signals to the PCIe controller 304a, 304b to control timing of execution of functions of the PCIe controller 304a, 304b. In some embodiments, the clock module 312a, 312b may provide clock signals to the control module 306a, 306b, and/or the I/O control module 316a, 316b. In some embodiments, the clock module 312a, 312b may be integral to the PCIe controller 304a, 304b. In some embodiments, the clock module 312a, 312b may be separate from the PCIe controller 304a, 304b, such as integral to the PCIe enabled device 302, 330 with which the PCIe controller 304a, 304b is associated.

A power module 310a, 310b may be configured to provide and/or regulate electric power to the PCIe controller 304a, 304b to control ability to execute functions of the PCIe controller 304a, 304b. In some embodiments, the power module 310a, 310b may provide and/or regulate electric power to the control module 306a, 306b, the I/O control module 316a, 316b, and/or the PCIe configuration registers 314a, 314b. In some embodiments, the power module 310a, 310b may be integral to the PCIe controller 304a, 304b. In some embodiments, the power module 310a, 310b may be separate from the PCIe controller 304a, 304b, such as integral to the PCIe enabled device 302, 330 with which the PCIe controller 304a, 304b is associated.

Figure 4:
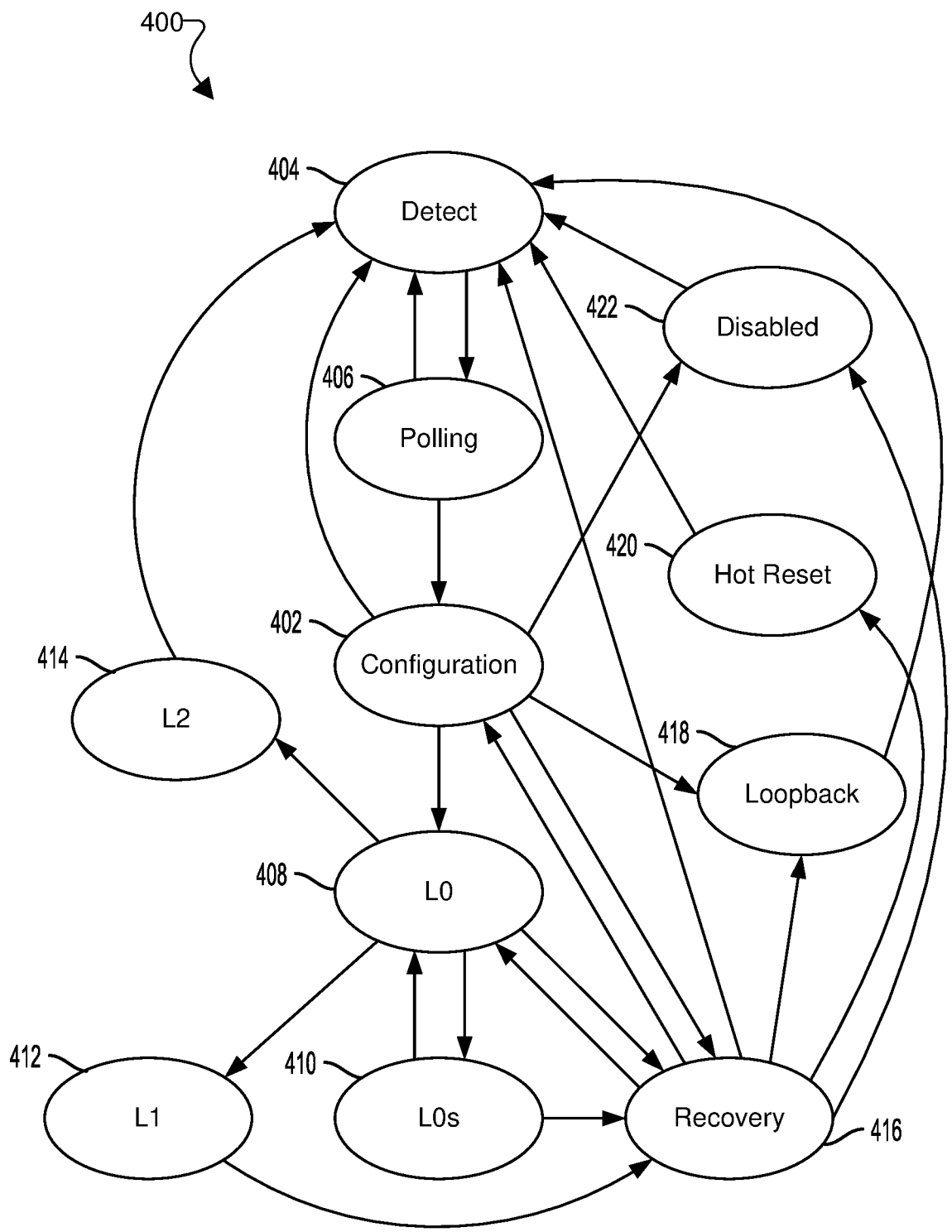
FIG. 4 is a graph flow diagram illustrating an example link training status and state machine according to an embodiment.

FIG. 4 illustrates an example LTSSM 400 according to an embodiment. With reference to FIGS. 1-4, the LTSSM 400 illustrates operating states of a PCIe controller (e.g., peripheral device interface 38 in FIGS. 1 and 2, PCIe controller 304a, 304b in FIG. 3) including states involved in link training. The example state machine illustrated in FIG. 4 in an LTSSM for the PCIe Gen 6 specification is provided for ease of explanation and clarity and is not intended to limit the specification and the scope of the claims to this version of an LTSSM. One skilled in the art would realize that that the descriptions herein may be similarly applied to any LTSSM for any specification of PCIe having a configuration state.

The LTSSM 400 may be implemented by the PCIe controller in a conventional manner with exception of a configuration state 402 ("configuration"). In other words, the PCIe controller may implement any of a detect state 404 ("detect"), a poling state 406 ("poling"), a normal operation state 408 ("L0"), standby state 410 ("L0s"), a low power state 412, 414 ("L1", "L2"), a recovery state 416 ("recovery"), a loopback state 418 ("loopback"), a hot reset state 420 ("hot reset"), and a disabled state 422 ("disabled") performing known operations. The PCIe controller may also transition between any of the states of the LTSSM 400 under known transition conditions.

In the configuration state 402, the PCIe controller may retrieve a PCIe link configuration mode data from PCIe configuration (e.g., PCIe configuration registers 314a, 314b in FIG. 3) and implement the PCIe link configuration process according to the corresponding PCIe link configuration mode. Based on one or more values of the PCIe link configuration mode data, the PCIe controller may be configured to interpret whether to implement one of a PCIe link reliability mode, a PCIe link power mode, a PCIe link default mode or no PCIe link mode, etc. as described further herein.

Figure 5A:
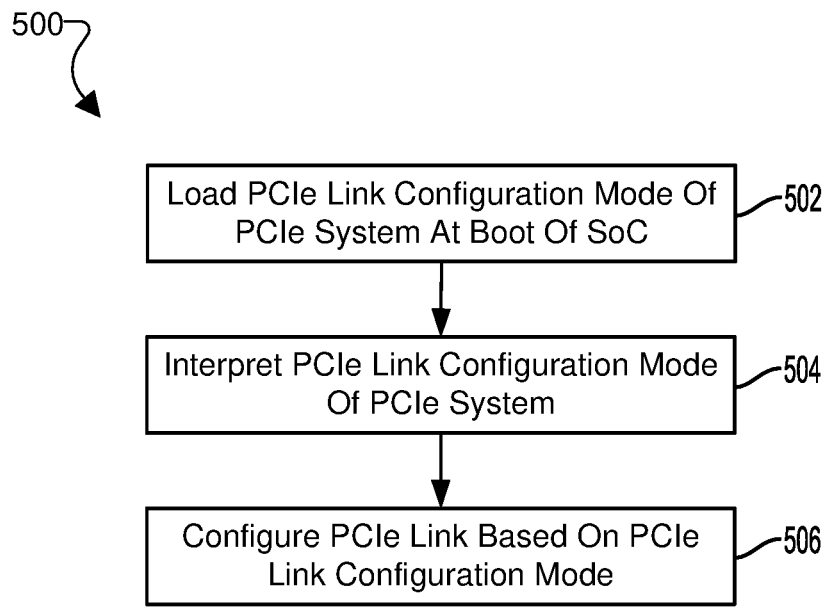
FIGS. 5A-5C are process flow diagrams illustrating example methods for triggering PCIe link configuration at a PCIe device according to an embodiment.
Figure 5B:
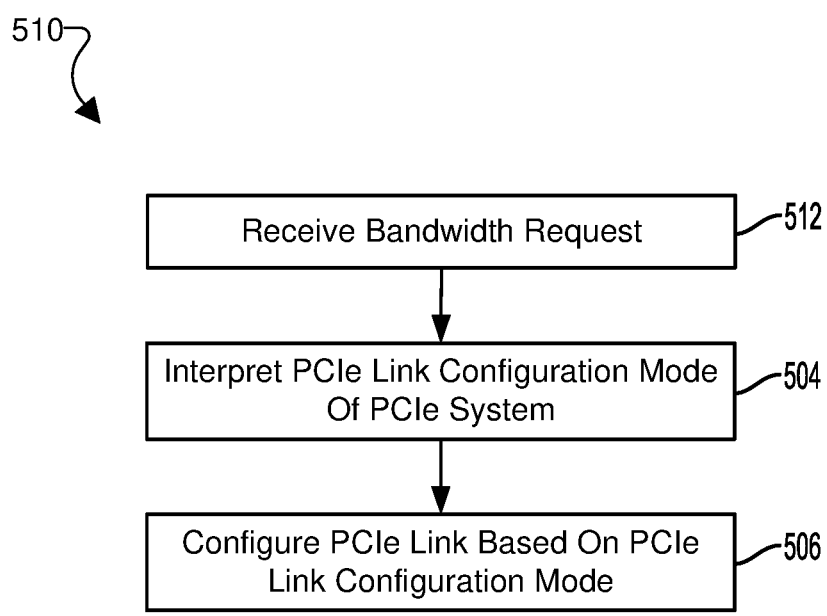
Figure 5C:
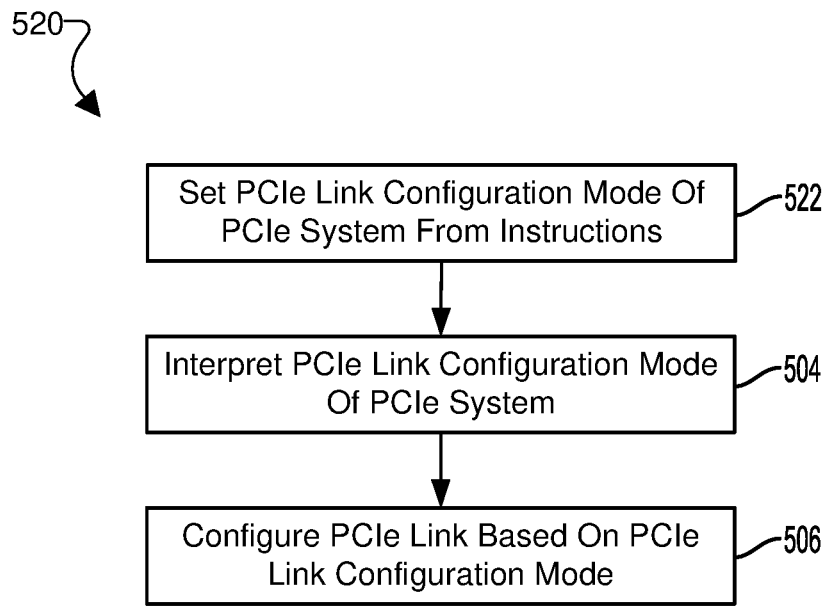

FIGS. 5A-5C illustrate example methods 500, 510, 520 for triggering a PCIe link configuration of a PCIe device according to various embodiments. With reference to FIGS. 1-5C, the methods 500, 510, 520 may be implemented in a computing device (e.g., computing device 10, SoC 12, PCIe enabled device 330), in hardware (e.g., peripheral device interface 38, PCIe controller 304b, control module 306b, I/O control module 316b, LTSSM 400), in software (e.g., control module 306b, I/O control module 316b, LTSSM 400) executing in a processor (e.g., processor 14, 210, PCIe controller 304b), or in a combination of a software-configured processor and dedicated hardware, such as a PCIe system (e.g., PCIe system 300), that includes other individual components, such as various memories/caches (e.g., memory 16, 24, 36, memory subsystem 212, PCIe configuration register 314b, memory 334) and various memory/cache controllers. In order to encompass the alternative configurations enabled in various embodiments, the hardware implementing the methods 500, 510, 520 is referred to herein as a "PCIe control device."

Referring to FIG. 5A, in block 502, the PCIe control device may load a PCIe configuration mode of a PCIe system (e.g., PCIe system 300) at a boot time of an SoC (e.g., SoC 12, PCIe enabled device 330) having a PCIe device (e.g., peripheral device interface 38, PCIe controller 304b). At boot time, part of the boot process may include instructions for loading PCIe link configuration mode data from a memory (e.g., memory 16, 24, 36, 334) to a PCIe configuration register (e.g., PCIe configuration register 314b). The PCIe link configuration mode data may be configured to indicate to the PCIe control device to implement a PCIe link reliability mode, a PCIe link power mode, a PCIe link default mode or no PCIe link mode, etc. In some embodiments, the PCIe control device loading the PCIe configuration mode of the PCIe system at the boot time of the SoC having the PCIe device in block 502 may include a peripheral device interface (e.g., peripheral device interface 38), a PCIe controller (PCIe controller 304b), a control module (control module 306b), and/or an I/O control module (I/O control module 316b).

In block 504, the PCIe control device may interpret the PCIe configuration mode of the PCIe system. During a link training process, such as implemented by an LTSSM (LTSSM 400) in a configuration state, the PCIe control device may be configured to retrieve the PCIe link configuration mode data from the PCIe configuration register. Based on one or more values of the PCIe link configuration mode data, the PCIe control device may be configured to interpret whether to implement one of the PCIe link reliability mode, the PCIe link power mode, the PCIe link default mode or no PCIe link mode, etc. In some embodiments, the PCIe control device interpreting the PCIe configuration mode of the PCIe system in block 504 may include the peripheral device interface, the PCIe controller, and/or the control module.

In block 506, the PCIe control device may configure a PCIe link (e.g., PCIe link 340) based on the PCIe configuration mode of the PCIe system. The PCIe control device implementing the PCIe link reliability mode may implement a PCIe link configuration process configured to configure the PCIe link with increased reliability compared to a current PCIe link configuration, which may include a default PCIe link configuration. The PCIe control device implementing the PCIe link power mode may implement a PCIe link configuration process configured to configure the PCIe link with lower power consumption compared to a current PCIe link configuration, which may include the default PCIe link configuration. In some embodiments, the PCIe control device configuring the PCIe link based on the PCIe configuration mode of the PCIe system in block 506 may include the peripheral device interface, the PCIe controller, and/or the control module. The PCIe control device implementing the PCIe link default mode or no PCIe link mode may implement a PCIe link configuration process configured to configure the PCIe link according to default PCIe link configuration parameters and/or PCIe link configuration parameters provided by software executed at a processing device (e.g., SoC 12, peripheral device 40, 202, 204, 206, 208, 210, 212, 214, PCIe enabled device 302, 330).

Figure 6:
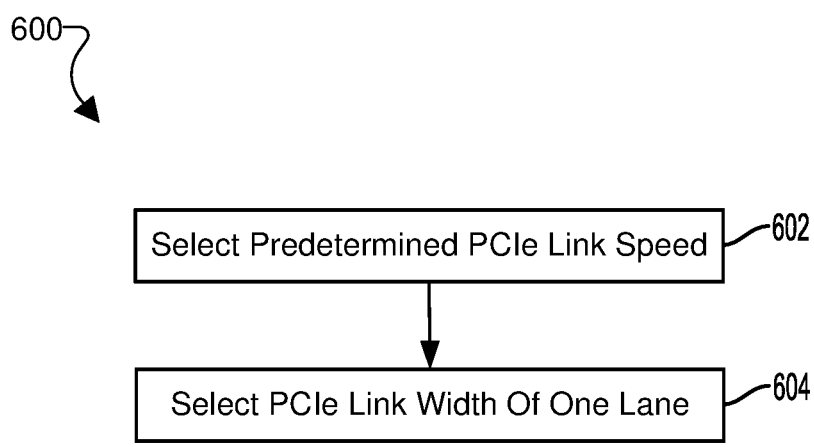
FIG. 6 is a process flow diagram illustrating an example method for implementing PCIe link configuration at the PCIe device according to an embodiment.

Configuring the PCIe line based on the PCIe link reliability mode and/or the PCIe link power mode is described further for the method 600 with reference to FIG. 6. Further configuring the PCIe line based on the PCIe link reliability mode is described further for the method 700 with reference to FIG. 7. Configuring the PCIe link configuration based on the PCIe link reliability mode may include modifying a current PCIe link configuration having a current PCIe link width and a current PCIe link speed. The current PCIe link configuration may be modified by increasing the PCIe link width relative to the current PCIe link width in response to a requested bandwidth exceeding a current bandwidth. The current PCIe link configuration may be modified by decreasing the predetermined PCIe link speed relative to the current PCIe link speed in response to the current bandwidth exceeding the requested bandwidth.

Figure 8:
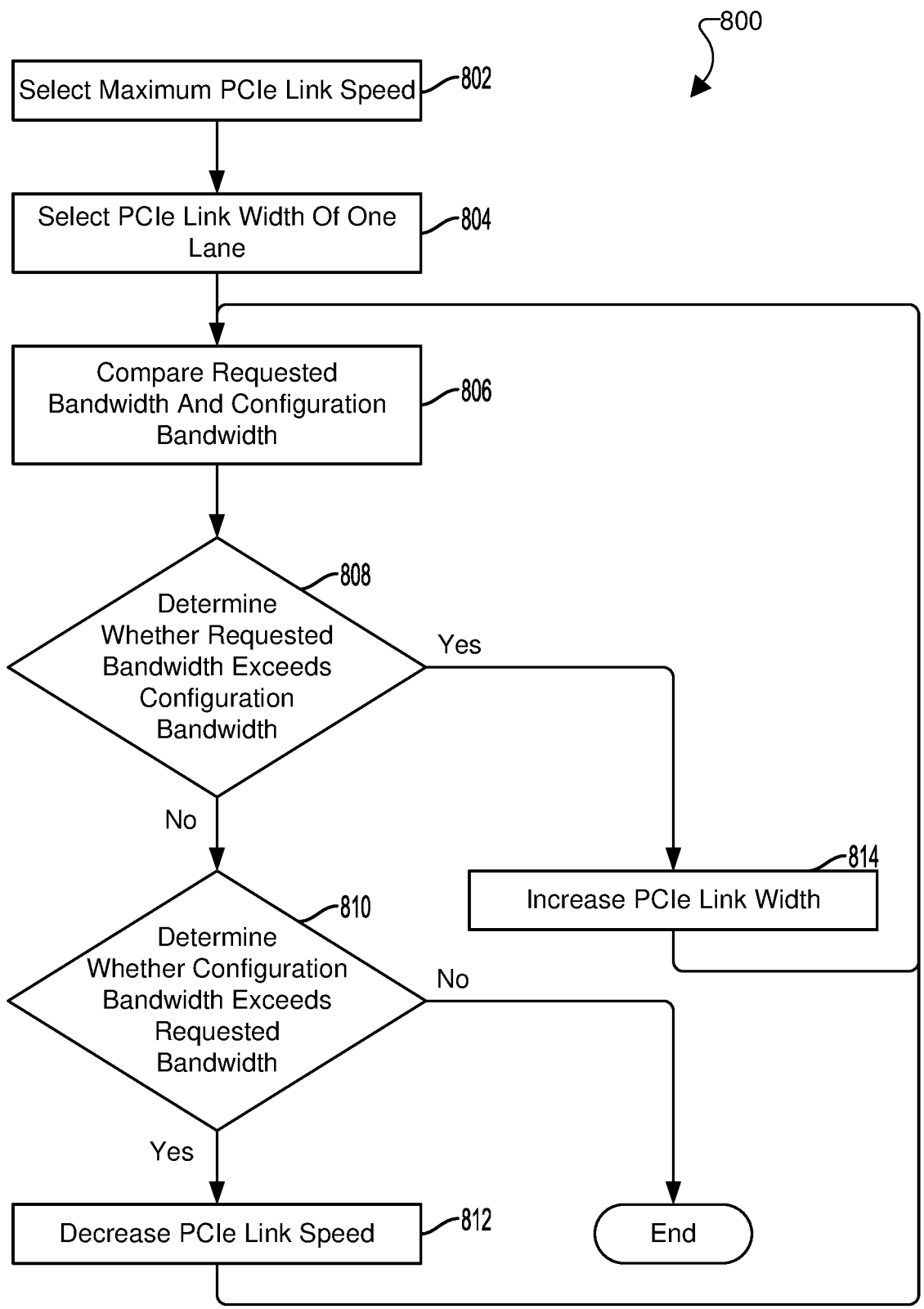
FIG. 8 is a process flow diagram illustrating an example method for implementing PCIe link configuration at the PCIe device for a PCIe link power mode according to an embodiment.

Further configuring the PCIe link based on the PCIe link power mode is described further for the method 800 with reference to FIG. 8. Configuring the PCIe link configuration based on the PCIe link power mode may include modifying a current PCIe link configuration having a current PCIe link width and a current PCIe link speed. The current PCIe link configuration may be modified by increasing the predetermined PCIe link speed relative to the current PCIe link speed in response to a requested bandwidth exceeding a current bandwidth. The current PCIe link configuration may be modified by decreasing the PCIe link width relative to the current PCIe link width in response to the current bandwidth exceeding the requested bandwidth.

Referring to FIG. 5B, in block 512, the PCIe control device may receive a bandwidth request from a software executed at a processing device (e.g., SoC 12, peripheral device 40, 202, 204, 206, 208, 210, 212, 214, PCIe enabled device 302, 330). The requested bandwidth from the software may be a bandwidth required for transmission of information in a PCIe system (e.g., PCIe system 300) between a PCIe endpoint and a PCIe host (e.g., SoC 12, peripheral device 40, 202, 204, 206, 208, 210, 212, 214, PCIe enabled device 302, 330) for the software to perform functions within given parameters. In some embodiments, the PCIe control device receiving the bandwidth request from the software executed at the processing device in block 512 may include a peripheral device interface (e.g., peripheral device interface 38), a PCIe controller (PCIe controller 304b), a control module (control module 306b), and/or an I/O control module (I/O control module 316b).

In block 504, the PCIe control device may interpret the PCIe configuration mode of the PCIe system. Block 504 may be implemented in a manner similar as described for the like numbered block with reference to FIG. 5A. In some embodiments, the PCIe control device interpreting the PCIe configuration mode of the PCIe system in block 504 may include the peripheral device interface, the PCIe controller, and/or the control module.

In block 506, the PCIe control device may configure a PCIe link (e.g., PCIe link 340) based on the PCIe configuration mode of the PCIe system. Block 506 may be implemented in a manner similar as described for the like numbered block with reference to FIG. 5A. In some embodiments, the PCIe control device configuring the PCIe link based on the PCIe configuration mode of the PCIe system in block 506 may include the peripheral device interface, the PCIe controller, and/or the control module.

Referring to FIG. 5C, in block 522, the PCIe control device may set a PCIe link configuration mode for a PCIe system (e.g., PCIe system 300) from an instruction received from a software executed at a processing device (e.g., SoC 12, peripheral device 40, 202, 204, 206, 208, 210, 212, 214, PCIe enabled device 302, 330). The instruction may include an indication of the PCIe link configuration mode, such as a PCIe link configuration mode data. The PCIe control device may store the PCIe link configuration mode data to a PCIe configuration register (e.g., PCIe configuration register 314b). The PCIe link configuration mode data may be configured to indicate to the PCIe control device to implement a PCIe link reliability mode, a PCIe link power mode, a PCIe link default mode or no PCIe link mode, etc. In some embodiments, the PCIe control device setting the PCIe link configuration mode for the PCIe system from the instruction received from the software executed at the processing device in block 522 may include a peripheral device interface (e.g., peripheral device interface 38), a PCIe controller (PCIe controller 304b), a control module (control module 306b), and/or an I/O control module (I/O control module 316b).

In block 504, the PCIe control device may interpret the PCIe configuration mode of the PCIe system. Block 504 may be implemented in a manner similar as described for the like numbered block with reference to FIG. 5A. In some embodiments, the PCIe control device interpreting the PCIe configuration mode of the PCIe system in block 504 may include the peripheral device interface, the PCIe controller, and/or the control module.

In block 506, the PCIe control device may configure a PCIe link (e.g., PCIe link 340) based on the PCIe configuration mode of the PCIe system. The operations in block 506 may be implemented in a manner similar to those described for the like numbered block with reference to FIG. 5A. In some embodiments, the PCIe control device configuring the PCIe link based on the PCIe configuration mode of the PCIe system in block 506 may include the peripheral device interface, the PCIe controller, and/or the control module.

FIG. 6 illustrates an example method 600 for implementing PCIe link configuration at a PCIe device according to an embodiment. With reference to FIGS. 1-6, the method 600 may be implemented in a computing device (e.g., computing device 10, SoC 12, PCIe enabled device 330), in hardware (e.g., peripheral device interface 38, PCIe controller 304b, control module 306b, I/O control module 316b, LTSSM 400), in software (e.g., control module 306b, I/O control module 316b, LTSSM 400) executing in a processor (e.g., processor 14, 210, PCIe controller 304b), or in a combination of a software-configured processor and dedicated hardware, such as a PCIe system (e.g., PCIe system 300), that includes other individual components, such as various memories/caches (e.g., memory 16, 24, 36, memory subsystem 212, PCIe configuration register 314b, memory 334) and various memory/cache controllers. In order to encompass the alternative configurations enabled in various embodiments, the hardware implementing the method 600 is referred to herein as a "PCIe control device."

In block 602, the PCIe control device may select a predetermined PCIe link speed. The predetermined PCIe link speed may be used by the PCIe control device for configuring a PCIe link (e.g., PCIe link 340) between a PCIe host (e.g., SoC 12, 330) and a PCIe endpoint (e.g., peripheral device 40, 202, 204, 206, 208, 210, 212, 214, 302) of a PCIe system (e.g., PCIe system 300). In some embodiments, selecting the predetermined PCIe link speed for a PCIe link reliability mode is described further regarding the operations of block 706 of the method 700 with reference to FIG. 7. In some embodiments, selecting the predetermined PCIe link speed for a PCIe link power mode is described further regarding in the operations of block 802 of the method 800 with reference to FIG. 8. In some embodiments, the PCIe control device selecting the predetermined PCIe link speed in block 602 may include a peripheral device interface (e.g., peripheral device interface 38), a PCIe controller (PCIe controller 304b), and/or a control module (control module 306b).

In block 604, the PCIe control device may select a PCIe link width of one lane. The PCIe link width may be used by the PCIe control device for configuring the PCIe link between the PCIe host and the PCIe endpoint of the PCIe system. The PCIe link width may control a number of lanes used for the PCIe link. In some embodiments, selecting the PCIe link width of one lane for a PCIe link reliability mode may be implemented in the operations of block 708 of the method 700 with reference to FIG. 7. In some embodiments, selecting the PCIe link width of one lane for the PCIe link power mode may be implemented in the operations of block 804 of the method 800 with reference to FIG. 8. In some embodiments, the PCIe control device selecting the PCIe link width of one lane in block 604 may include the peripheral device interface, the PCIe controller, and/or the control module.

Figure 7:
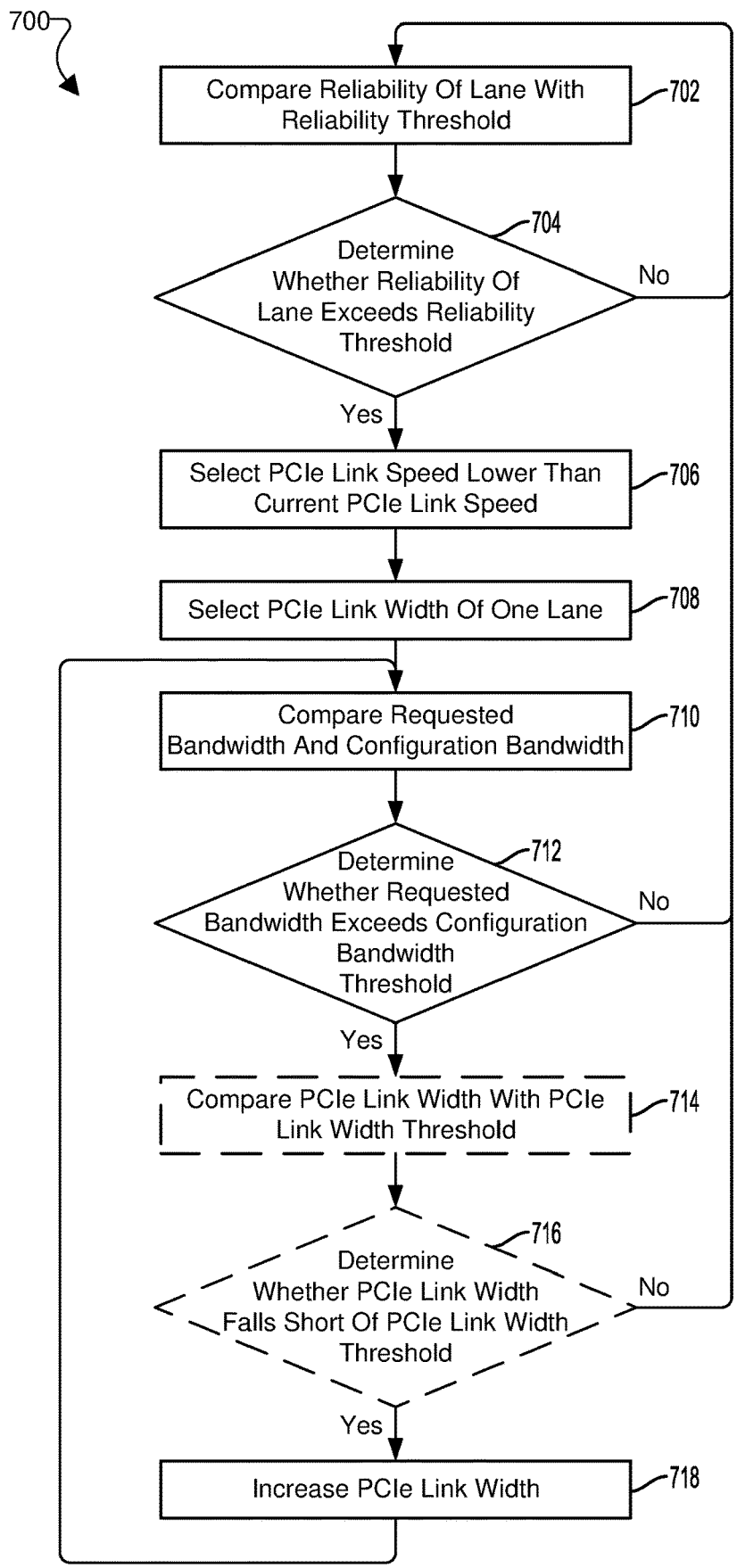
FIG. 7 is a process flow diagram illustrating an example method for implementing PCIe link configuration at the PCIe device for a PCIe link reliability mode according to an embodiment.

FIG. 7 illustrates an example method 700 for implementing PCIe link configuration at a PCIe device for a PCIe link reliability mode according to an embodiment. With reference to FIGS. 1-7, the method 700 may be implemented in a computing device (e.g., computing device 10, SoC 12, PCIe enabled device 330), in hardware (e.g., peripheral device interface 38, PCIe controller 304b, control module 306b, I/O control module 316b, LTSSM 400), in software (e.g., control module 306b, I/O control module 316b, LTSSM 400) executing in a processor (e.g., processor 14, 210, PCIe controller 304b), or in a combination of a software-configured processor and dedicated hardware, such as a PCIe system (e.g., PCIe system 300), that includes other individual components, such as various memories/caches (e.g., memory 16, 24, 36, memory subsystem 212, PCIe configuration register 314b, memory 334) and various memory/cache controllers. In order to encompass the alternative configurations enabled in various embodiments, the hardware implementing the method 700 is referred to herein as a "PCIe control device."

In block 702, the PCIe control device may compare a reliability of a lane of a PCIe link (e.g., PCIe link 340) and reliability threshold. The reliability of the lane of the PCIe link and the reliability threshold may include various indicators and/or measures of reliability. For example, reliability may be expressed in terms of a bit error rate, an amount of electromagnetic interference, and/or other channel losses. In some embodiments, the indicators and/or measures of reliability may be provided to the PCIe controller, such as by a software executed at a processing device (e.g., SoC 12, peripheral device 40, 202, 204, 206, 208, 210, 212, 214, PCIe enabled device 302, 330). In some embodiments, the indicators and/or measures of reliability may be generated by the PCIe controller. The PCIe controller may be preconfigured with the reliability threshold. For example, the reliability threshold may be stored to and retrieved from a PCIe configuration register (e.g., PCIe configuration register 314b). In some embodiments, the PCIe control device comparing the reliability of the lane of the PCIe link and the reliability threshold in block 702 may include a peripheral device interface (e.g., peripheral device interface 38), a PCIe controller (PCIe controller 304b), and/or a control module (control module 306b).

In determination block 704, the PCIe control device may determine whether the reliability of the lane of the PCIe link exceeds the reliability threshold. The PCIe device may use the results of the comparison of the reliability of the lane of the PCIe link and the reliability threshold to determine whether the reliability of the lane of the PCIe link exceeds the reliability threshold. In some embodiments, the PCIe control device determining whether the reliability of the lane of the PCIe link exceeds the reliability threshold in determination block 704 may include the peripheral device interface, the PCIe controller, and/or the control module.

In response to determining that the reliability of the lane of the PCIe link does not exceed the reliability threshold (i.e., block 704="No"), the PCIe control device may compare the reliability of the lane of the PCIe link and the reliability threshold in block 702. In some embodiments, the PCIe control device comparing the reliability of the lane of the PCIe link and the reliability threshold in block 702 may include the peripheral device interface, the PCIe controller, and/or a control module.

In response to determining that the reliability of the lane of the PCIe link exceeds the reliability threshold (i.e., block 704="Yes"), the PCIe control device may select a PCIe link speed lower than a current PCIe link speed in block 706. PCIe links may be configured using various PCIe gen/version link speeds. While the PCIe link speed for a current PCIe link configuration is not a lowest PCIe link speed, the PCIe control device may select a PCIe link speed that is lower than the current PCIe link speed. For example, the PCIe control device may select a PCIe link speed that is one level lower than a current PCIe link speed. The selected PCIe link speed may be used by the PCIe control device for configuring the PCIe link between a PCIe host (e.g., SoC 12, 330) and a PCIe endpoint (e.g., peripheral device 40, 202, 204, 206, 208, 210, 212, 214, 302) of a PCIe system (e.g., PCIe system 300). In some embodiments, the PCIe control device selecting the PCIe link speed lower than the current PCIe link speed in block 706 may include the peripheral device interface, the PCIe controller, and/or a control module.

In block 708, the PCIe control device may select a PCIe link width of one lane. The PCIe link width may be used by the PCIe control device for configuring the PCIe link between the PCIe host and the PCIe endpoint of the PCIe system. The PCIe link width may control a number of lanes used for the PCIe link. In some embodiments, the PCIe control device selecting the PCIe link width of one lane in block 708 may include the peripheral device interface, the PCIe controller, and/or a control module.

In block 710, the PCIe control device may compare a requested bandwidth and a configuration bandwidth. The PCIe control device may receive a bandwidth request from a software executed at a processing device (e.g., SoC 12, peripheral device 40, 202, 204, 206, 208, 210, 212, 214, PCIe enabled device 302, 330). The requested bandwidth from the software may be a bandwidth required for transmission of information in the PCIe system between the PCIe endpoint and the PCIe host for the software to perform functions within given parameters. The configuration bandwidth may be a bandwidth enabled by the PCIe link configuration based on the PCIe link speed and PCIe link width. The PCIe control device may determine the configuration bandwidth based on the PCIe link configuration, such as from a lookup table based on an association with the PCIe link speed and PCIe link width. The PCIe controller may be preconfigured with configuration bandwidth associated with different combinations of PCIe link speeds and PCIe link widths. In some embodiments, the PCIe control device comparing a requested bandwidth and a configuration bandwidth in block 710 may include the peripheral device interface, the PCIe controller, and/or a control module.

In determination block 712, the PCIe control device may determine whether the requested bandwidth exceeds the configuration bandwidth. The PCIe device may use the results of the comparison of the requested bandwidth and the configuration bandwidth to determine whether the requested bandwidth exceeds the configuration bandwidth. In some embodiments, the PCIe control device determining whether the requested bandwidth exceeds the configuration bandwidth in determination block 712 may include the peripheral device interface, the PCIe controller, and/or the control module.

In response to determining that the requested bandwidth does not exceed the configuration bandwidth (i.e., block 712="No"), the PCIe control device may compare a requested bandwidth and a configuration bandwidth in block 710. In some embodiments, the PCIe control device comparing the requested bandwidth and the configuration bandwidth in block 710 may include the peripheral device interface, the PCIe controller, and/or a control module.

In response to determining that the requested bandwidth exceeds the configuration bandwidth (i.e., block 712="Yes"), the PCIe control device may compare the PCIe link width to a PCIe link width threshold in optional block 714. PCIe links may be configured using various PCIe link widths of different numbers of lanes. There may be a limit as to the number of lanes that may be used for a PCIe link, which may be represented as the PCIe link width threshold. The PCIe configuration device may be preconfigured with the PCIe link width threshold. The PCIe control device may compare the PCIe link width, which may be represented as a number of lanes, and the PCIe link width threshold, which may be represented as a maximum number of lanes. In some embodiments, the PCIe control device comparing the PCIe link width to the PCIe link width threshold in optional block 714 may include the peripheral device interface, the PCIe controller, and/or a control module.

In optional determination block 716, the PCIe control device may determine whether the PCIe link width falls short of the PCIe link width threshold. The PCIe device may use the results of the comparison of the PCIe link and the PCIe link width threshold to determine whether the PCIe link width falls short of the PCIe link width threshold. In some embodiments, the PCIe control device determining whether the PCIe link width falls short of the PCIe link width threshold in optional determination block 716 may include the peripheral device interface, the PCIe controller, and/or the control module.

In response to determining that the PCIe link width does not fall short of the PCIe link width threshold (i.e., optional block 716="No"), the PCIe control device may compare the reliability of the lane of the PCIe link and the reliability threshold in block 702. In some embodiments, the PCIe control device comparing the reliability of the lane of the PCIe link and the reliability threshold in block 702 may include the peripheral device interface, the PCIe controller, and/or a control module.

In response to determining that the requested bandwidth exceeds the configuration bandwidth (i.e., block 712="Yes"); or response to determining that the PCIe link width fall short of the PCIe link width threshold (i.e., optional block 716="Yes"), the PCIe control device may increase the PCIe link width in block 718. The PCIe control device may increase the PCIe link width by increasing the number of lanes used for the PCIe link. For examples, the PCIe control device may increase the number of lanes used for the PCIe link by one lane. The PCIe link width may be used by the PCIe control device for configuring the PCIe link between the PCIe host and the PCIe endpoint of the PCIe system. In some embodiments, the PCIe control device increasing the PCIe link width in block 718 may include the peripheral device interface, the PCIe controller, and/or a control module.

Following increasing the PCIe link width in block 718, the PCIe control device may compare the requested bandwidth and the configuration bandwidth in block 710. In some embodiments, the PCIe control device comparing a requested bandwidth and a configuration bandwidth in block 710 may include the peripheral device interface, the PCIe controller, and/or a control module.

FIG. 8 illustrates an example method 800 for implementing PCIe link configuration at a PCIe device for a PCIe link power mode according to an embodiment. With reference to FIGS. 1-8, the method 800 may be implemented in a computing device (e.g., computing device 10, SoC 12, PCIe enabled device 330), in hardware (e.g., peripheral device interface 38, PCIe controller 304b, control module 306b, I/O control module 316b, LTSSM 400), in software (e.g., control module 306b, I/O control module 316b, LTSSM 400) executing in a processor (e.g., processor 14, 210, PCIe controller 304b), or in a combination of a software-configured processor and dedicated hardware, such as a PCIe system (e.g., PCIe system 300), that includes other individual components, such as various memories/caches (e.g., memory 16, 24, 36, memory subsystem 212, PCIe configuration register 314b, memory 334) and various memory/cache controllers. In order to encompass the alternative configurations enabled in various embodiments, the hardware implementing the method 800 is referred to herein as a "PCIe control device."

In block 802, the PCIe control device may select a maximum PCIe link speed for a PCIe link (PCIe link 304). PCIe links may be configured using various PCIe gen/version link speeds. There may be a limit as to how fast PCIe link speed may be set based on the which PCIe gen/version link speeds are enabled. The PCIe control device may be preconfigured with the maximum PCIe link speed for a PCIe link and may select the maximum PCIe link speed for a PCIe link. The selected PCIe link speed may be used by the PCIe control device for configuring the PCIe link between a PCIe host (e.g., SoC 12, 330) and a PCIe endpoint (e.g., peripheral device 40, 202, 204, 206, 208, 210, 212, 214, 302) of a PCIe system (e.g., PCIe system 300). In some embodiments, the PCIe control device selecting the maximum PCIe link speed for the PCIe link in block 802 may include a peripheral device interface (e.g., peripheral device interface 38), a PCIe controller (PCIe controller 304b), and/or a control module (control module 306b).

In block 804, the PCIe control device may select a PCIe link width of one lane. The PCIe link width may be used by the PCIe control device for configuring the PCIe link between the PCIe host and the PCIe endpoint of the PCIe system. The PCIe link width may control a number of lanes used for the PCIe link. In some embodiments, the PCIe control device selecting the PCIe link width of one lane in block 804 may include the peripheral device interface, the PCIe controller, and/or a control module.

In block 806, the PCIe control device may compare a requested bandwidth and a configuration bandwidth. The PCIe control device may receive a bandwidth request from a software executed at a processing device (e.g., SoC 12, peripheral device 40, 202, 204, 206, 208, 210, 212, 214, PCIe enabled device 302, 330). The requested bandwidth from the software may be a bandwidth required for transmission of information in the PCIe system between the PCIe endpoint and the PCIe host for the software to perform functions within given parameters. The configuration bandwidth may be a bandwidth enabled by the PCIe link configuration based on the PCIe link speed and PCIe link width. The PCIe control device may determine the configuration bandwidth based on the PCIe link configuration, such as from a lookup table based on an association with the PCIe link speed and PCIe link width. The PCIe controller may be preconfigured with configuration bandwidth associated with different combinations of PCIe link speeds and PCIe link widths. In some embodiments, the PCIe control device comparing a requested bandwidth and a configuration bandwidth in block 806 may include the peripheral device interface, the PCIe controller, and/or a control module.

In determination block 808, the PCIe control device may determine whether the requested bandwidth exceeds the configuration bandwidth. The PCIe device may use the results of the comparison of the requested bandwidth and the configuration bandwidth to determine whether the requested bandwidth exceeds the configuration bandwidth. In some embodiments, the PCIe control device determining whether the requested bandwidth exceeds the configuration bandwidth in determination block 808 may include the peripheral device interface, the PCIe controller, and/or the control module.

In response to determining that the requested bandwidth does not exceed the configuration bandwidth (i.e., block 808="No"), the PCIe control device may determine whether the configuration bandwidth exceeds the requested bandwidth in determination block. The PCIe device may use the results of the comparison of the requested bandwidth and the configuration bandwidth to determine whether the configuration bandwidth exceeds the requested bandwidth. In some embodiments, the PCIe control device determining whether the configuration bandwidth exceeds the requested bandwidth in determination block 810 may include the peripheral device interface, the PCIe controller, and/or the control module.

In response to determining that the configuration bandwidth exceeds the requested bandwidth (i.e., block 810="Yes"), the PCIe control device may decrease the PCIe link speed in block 812. While the PCIe link speed for the PCIe link configuration is not a lowest PCIe link speed, the PCIe control device may decrease the PCIe link speed to a PCIe link speed that is lower. For example, the PCIe control device may decrease the PCIe link speed to one level lower than the PCIe link speed. The PCIe link speed may be used by the PCIe control device for configuring the PCIe link between the PCIe host and the PCIe endpoint. In some embodiments, the PCIe control device decreasing the PCIe link speed in block 812 may include the peripheral device interface, the PCIe controller, and/or a control module.

Following decreasing the PCIe link speed in block 812, the PCIe control device may compare a requested bandwidth and a configuration bandwidth in block 806. In some embodiments, the PCIe control device comparing the requested bandwidth and the configuration bandwidth in block 806 may include the peripheral device interface, the PCIe controller, and/or a control module.

In response to determining that the requested bandwidth exceeds the configuration bandwidth (i.e., block 808="Yes"), the PCIe control device may increase the PCIe link width in block 814. The PCIe control device may increase the PCIe link width by increasing the number of lanes used for the PCIe link. For examples, the PCIe control device may increase the number of lanes used for the PCIe link by one lane. The PCIe link width may be used by the PCIe control device for configuring the PCIe link between the PCIe host and the PCIe endpoint of the PCIe system. In some embodiments, the PCIe control device increasing the PCIe link width in block 814 may include the peripheral device interface, the PCIe controller, and/or a control module.

Following increasing the PCIe link width in block 814, the PCIe control device may compare a requested bandwidth and a configuration bandwidth in block 806. In some embodiments, the PCIe control device comparing the requested bandwidth and the configuration bandwidth in block 806 may include the peripheral device interface, the PCIe controller, and/or a control module.

Figure 9:
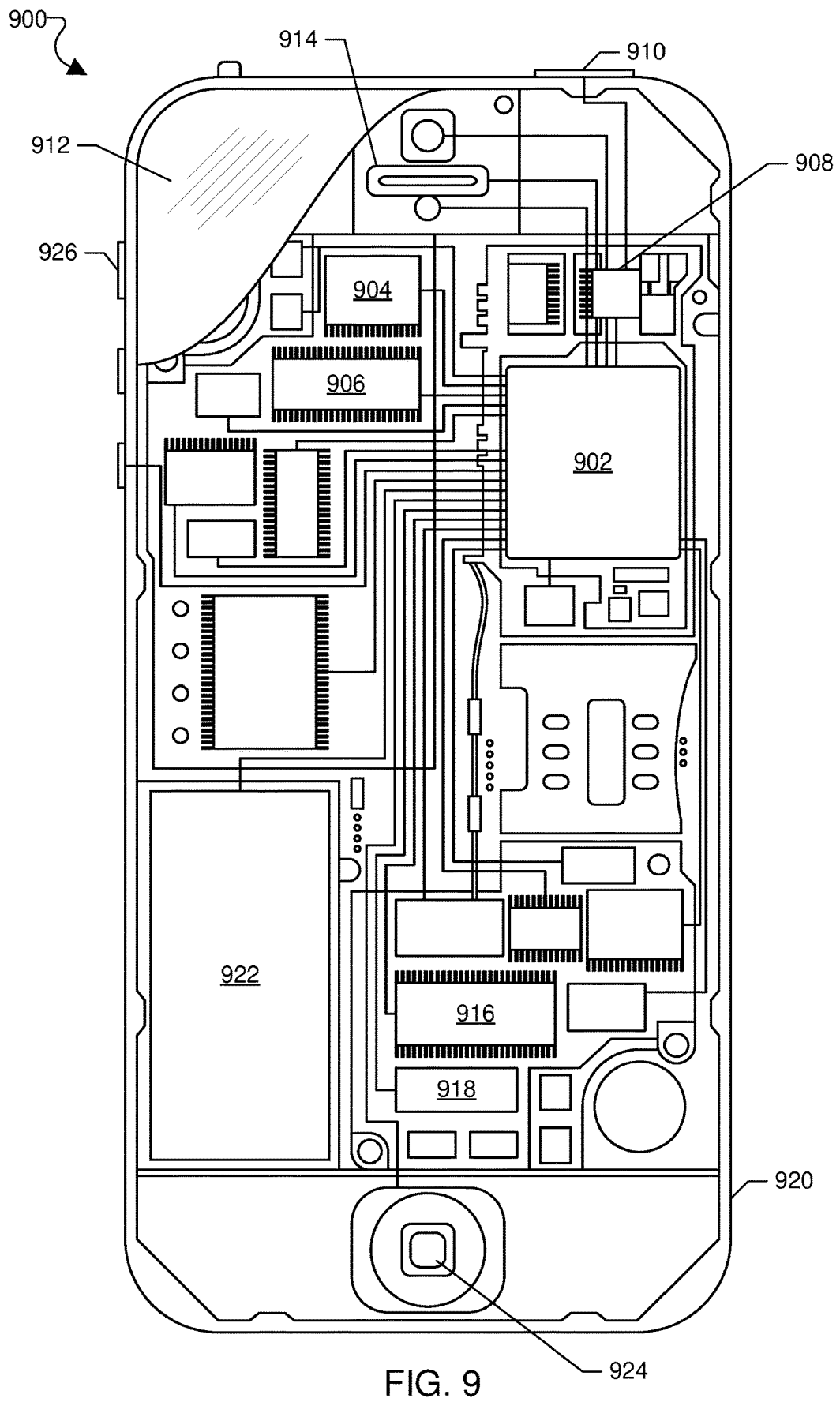
FIG. 9 is a component block diagram illustrating an example mobile computing device suitable for implementing various embodiments.

A system in accordance with the various embodiments (including, but not limited to, embodiments described above with reference to FIGS. 1-8) may be implemented in a wide variety of computing systems including mobile computing devices, an example of which suitable for use with the various embodiments is illustrated in FIG. 9. The mobile computing device 900 may include a processor 902 coupled to a touchscreen controller 904 and an internal memory 906. The processor 902 may be one or more multicore integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile computing device 900 need not have touch screen capability.

The mobile computing device 900 may have one or more radio signal transceivers 908 (e.g., Peanut, Bluetooth, Zig-Bee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as Universal Serial Bus (USB), FireWire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, constructed of a plastic, metal, or a combination of materials, for containing all or some of the components described herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
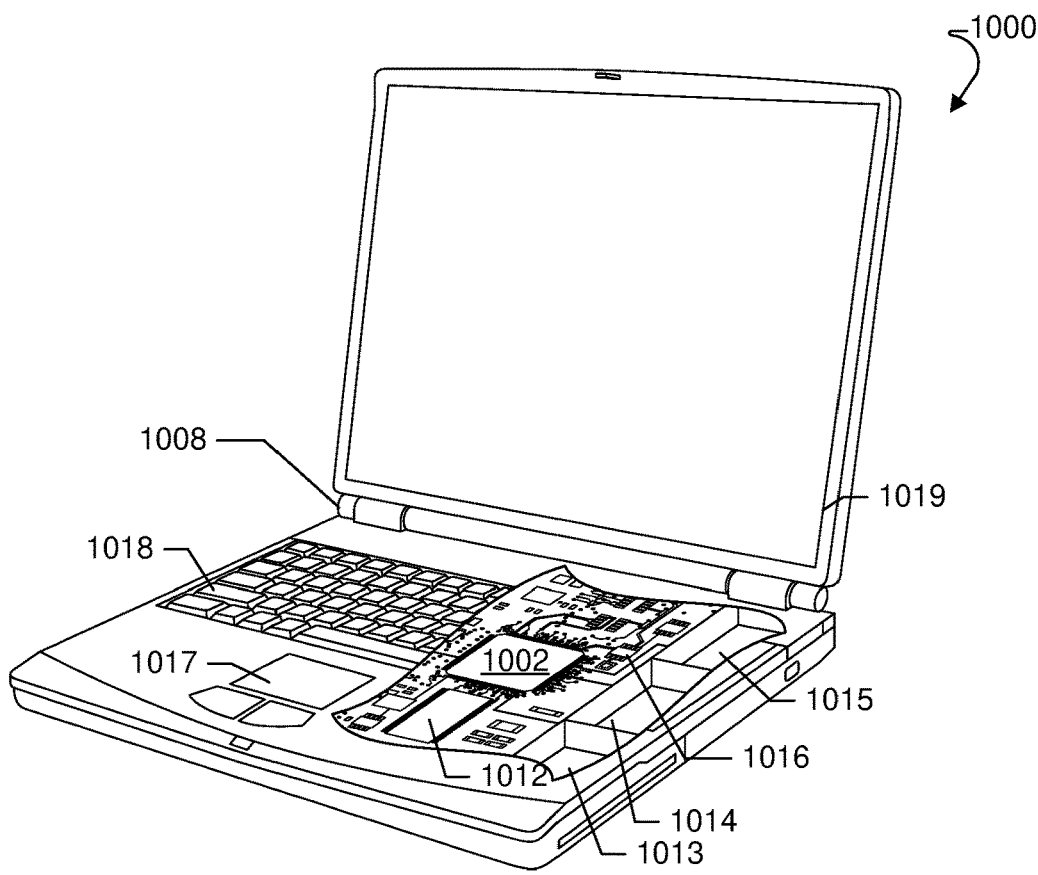
FIG. 10 is a component block diagram illustrating an example mobile computing device suitable for implementing various embodiments.

A system in accordance with the various embodiments (including, but not limited to, embodiments described above with reference to FIGS. 1-8) may be implemented in a wide variety of computing systems include a laptop computer 1000, an example of which is illustrated in FIG. 10. Many laptop computers include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1002 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1002. The computer 1000 may also include a floppy disc drive 1014 and a compact disc (CD) drive 1015 coupled to the processor 1002. In a notebook configuration, the computer housing includes the touchpad 1017, the keyboard 1018, and the display 1019 all coupled to the processor 1002. Other configurations of the computing device may include a computer mouse or trackball coupled to the processor (e.g., via a USB input) as are well known, which may also be used in conjunction with the various embodiments.

Figure 11:
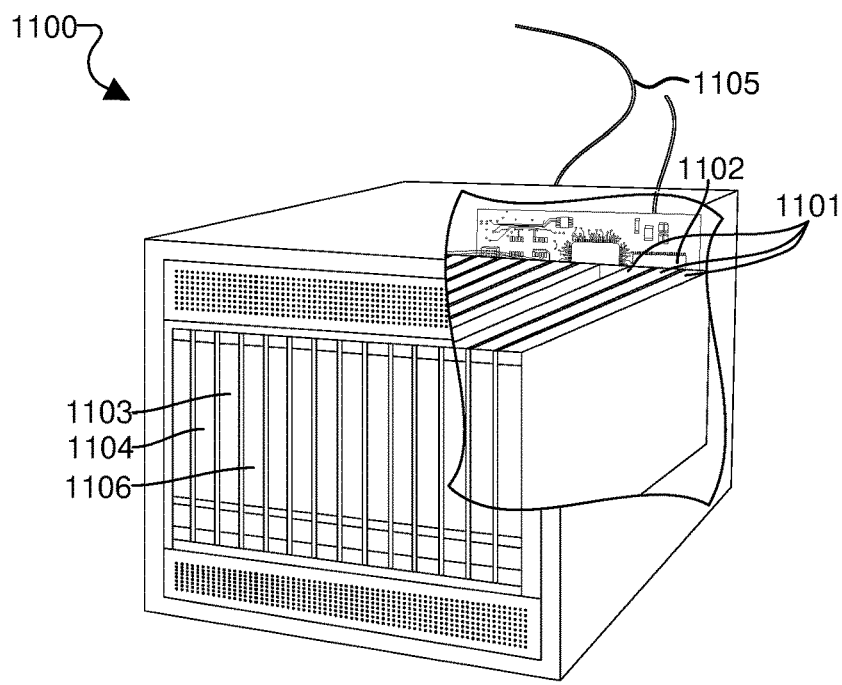
FIG. 11 is a component block diagram illustrating an example server suitable for implementing various embodiments.

A system in accordance with the various embodiments (including, but not limited to, embodiments described above with reference to FIGS. 1-8) may also be implemented in fixed computing systems, such as any of a variety of commercially available servers. An example server 1100 is illustrated in FIG. 11. Such a server 1100 typically includes one or more multicore processor assemblies 1101 coupled to volatile memory 1102 and a large capacity nonvolatile memory, such as a disk drive 1104. As illustrated in FIG. 11, multicore processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multicore processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Figure 12A:
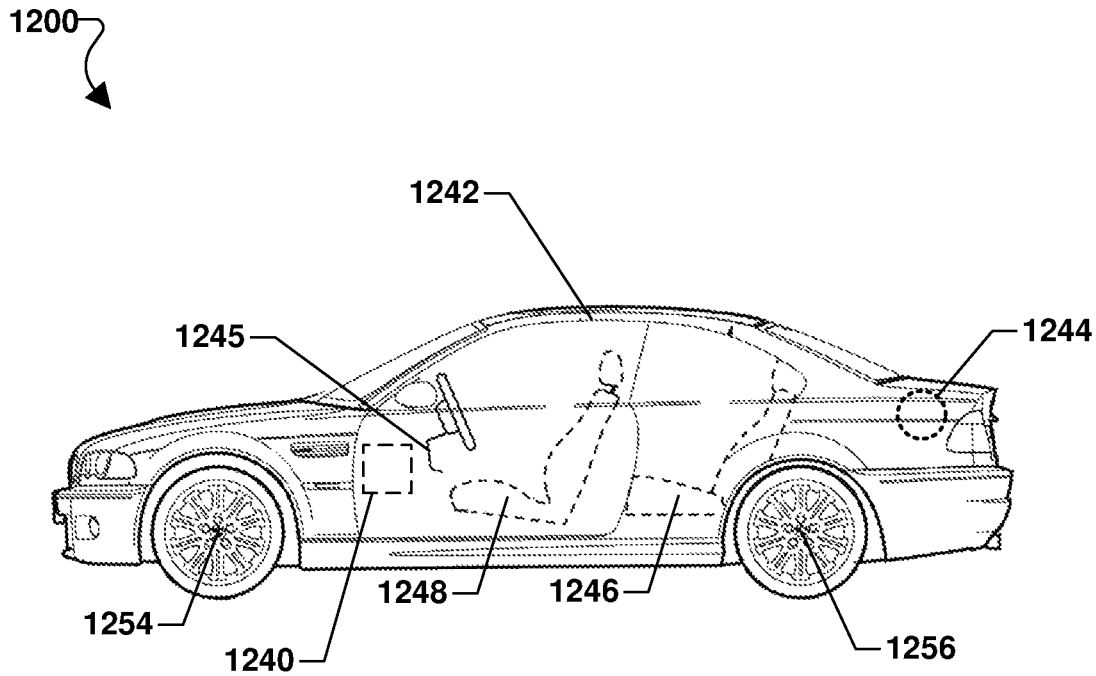
FIGS. 12A-12C are component block diagrams illustrating an example embedded vehicle computing system suitable for implementing various embodiments.
Figure 12B:
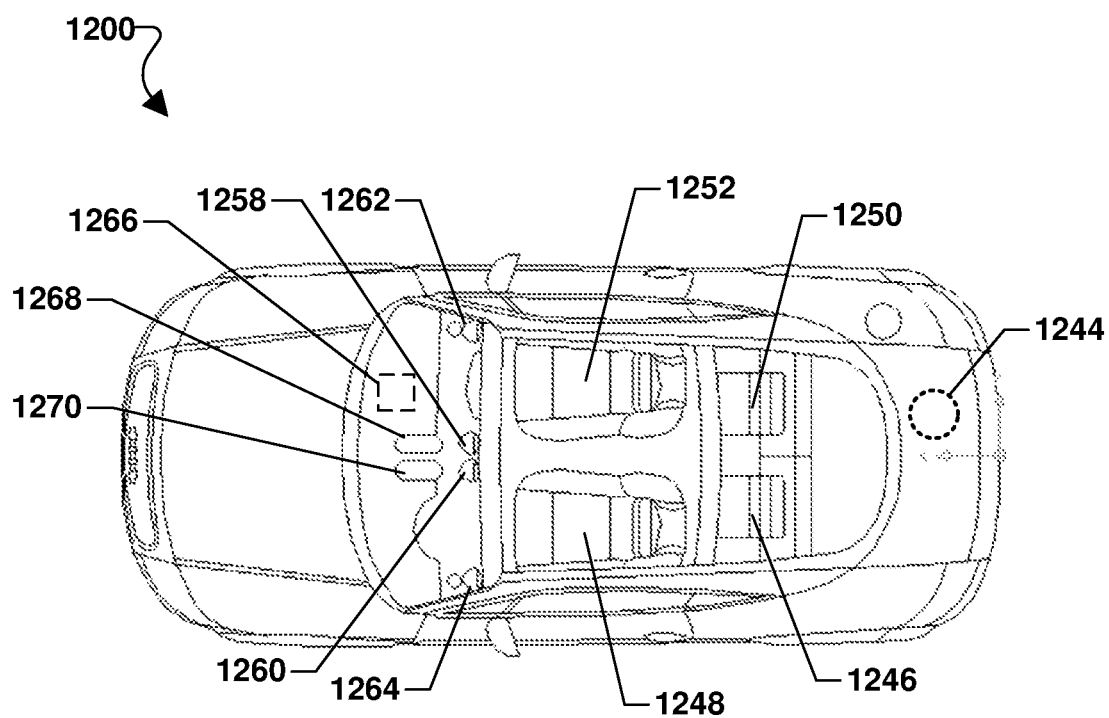
Figure 12C:
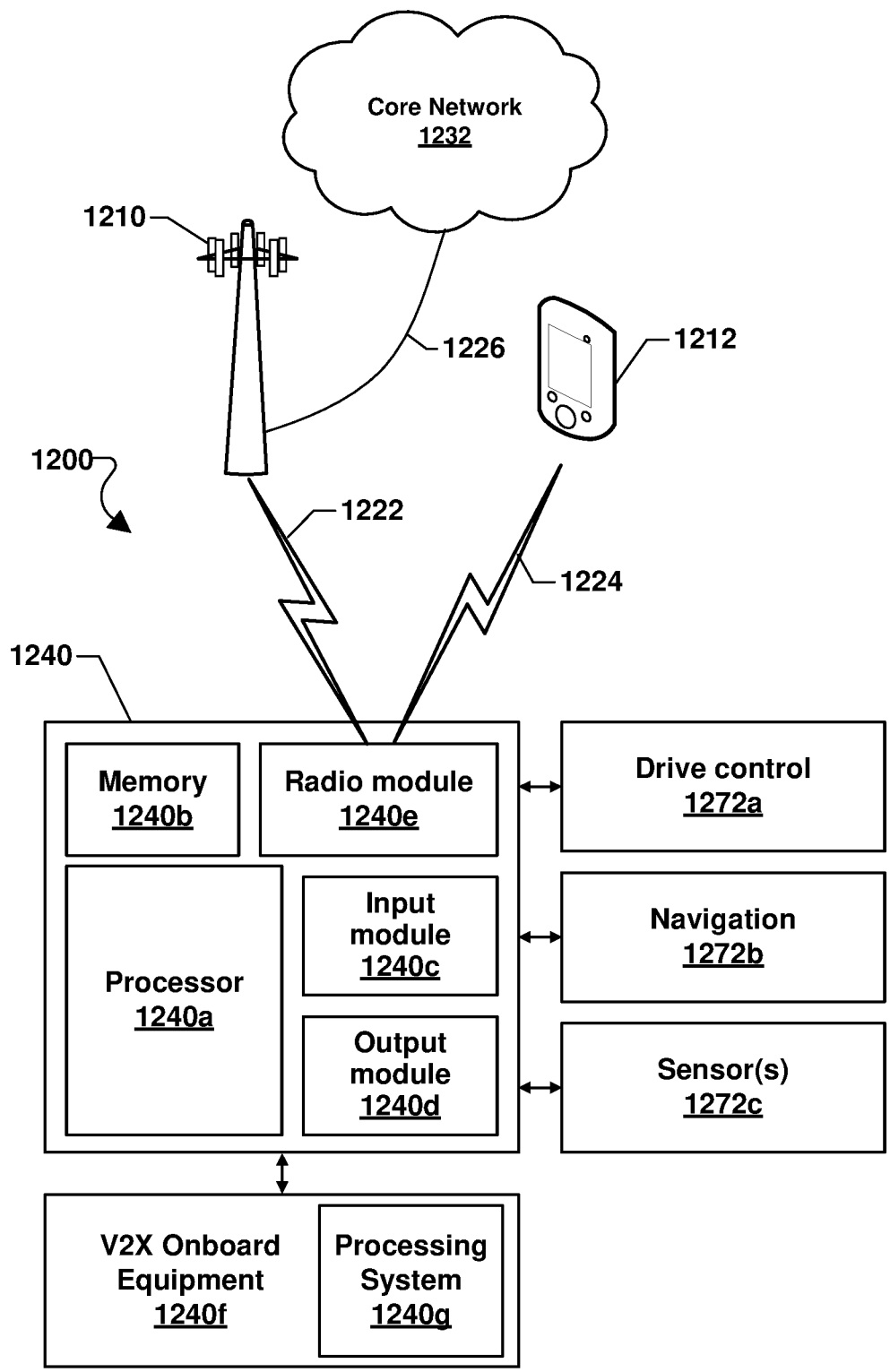

Methods and devices for implementing such methods in accordance with the various embodiments (including, but not limited to, embodiments described above with reference to FIGS. 1-8) may be implemented in a wide variety of computing systems including an embedded vehicle computing system 1200 an example of which is illustrated in FIGS. 12A-12C. An embedded vehicle computing system 1200 may include a vehicle control unit 1240, such as an ECU, which may include a processor, such as a CPU, an AI processor, etc. The embedded vehicle computing system 1200 may include a plurality of sensors 1242-1270, including satellite geopositioning system receivers 1242, accelerometers 1244, occupancy sensors 1246, 1248, 1250, 1252, tire pressure sensors 1254, 1256, cameras 1258, 1260, microphones 1262, 1264, impact sensors 1266, external sensors 1268, 1270.

The plurality of sensors 1242-1270, disposed in or on the vehicle, may be used for various purposes, such as navigation, crash avoidance, etc., as well to provide sensor data regarding objects and people in or on the vehicle. The sensors 1242-1270 may include one or more of a wide variety of sensors capable of detecting a variety of information useful for navigation and collision avoidance. Each of the sensors 1242-1270 may be in wired or wireless communication with a control unit 1240, as well as with each other. In particular, the sensors may include one or more cameras 1258, 1260 or other optical sensors or photo optic sensors. The sensors may further include other types of object detection and ranging sensors, such as external sensors 1268, 1270, IR sensors, and ultrasonic sensors. The sensors may further include tire pressure sensors 1254, 1256, humidity sensors, temperature sensors, satellite geopositioning sensors 1242, control input sensors 1245, accelerometers 1244, vibration sensors, gyroscopes, gravimeters, impact sensors 1266, force meters, stress meters, strain sensors, fluid sensors, chemical sensors, gas content analyzers, pH sensors, radiation sensors, Geiger counters, neutron detectors, biological material sensors, microphones 1262, 1264, occupancy sensors 1246, 1248, 1250, 1252, proximity sensors, and other sensors.

The vehicle control unit 1240 may include one or more processors configured with processor-executable instructions to perform navigation and collision avoidance operations using information received from various sensors, particularly the cameras 1258, 1260. In some embodiments, the control unit 1240 may supplement the processing of camera images using distance and relative position (e.g., relative bearing angle) that may be obtained from external sensors 1268, 1270. The control unit 1240 may further be configured to control steering, breaking and speed of the vehicle using information regarding other vehicles determined using various embodiments. The vehicle control unit 1240 may include one or more processors configured with processor-executable instructions to receive information from the sensors 1242-1270 and to perform operations using such information as further described herein. In various embodiments, the vehicle control unit 1240 may include, be a component of, or communicate with V2X onboard equipment of the vehicle.

FIG. 12C is a component block diagram illustrating the embedded vehicle computing system 1200 including components and support systems suitable for implementing various embodiments. The embedded vehicle computing system 1200 may include the control unit 1240, which may include various circuits and devices used to control the operation of the vehicle. The control unit 1240 may include a processor 1240a, such as a CPU, an AI processor, etc., a memory 1240b, an input module 1240c, an output module 1240d, and a radio module 1240e. The control unit 1240 may be coupled to and configured to control drive control components 1272a, navigation components 1272b, and one or more sensors 1272c of the embedded vehicle computing system 1200. The control unit 1240 may communicate with V2X onboard equipment 1240f. The processor 1240a may be configured with processor-executable instructions to control maneuvering, navigation, and/or other operations of the vehicle, including operations of various embodiments, including gathering and analyzing real-world vehicle run data gathered from the sensors 1272c. The processor 1240a may be coupled to the memory 1240b. The V2X onboard equipment 1240f may include one or more processors 1240g configured with processor-executable instructions to perform various operations of various embodiments, including communicating real-world vehicle run data gathered from the sensors 1272c between the embedded vehicle computing system 1240 and a wireless communication device 1212 and/or the computing device on a communication network (e.g., a core network 1232) via the radio module 1240e.

The radio module 1240e may be configured for wireless communication. The radio module 1240e may exchange signals (e.g., command signals for controlling maneuvering, signals from navigation facilities, data signals, etc.) via a communication link 1222 with a network transceiver (e.g., the base station 1210), and may provide the signals to the processor 1240a, 1240g and/or the navigation unit 1272b. In some embodiments, the radio module 1240e may enable the embedded vehicle computing system 1200 to communicate with a wireless communication device 1212 through the wireless communication link 1224. The wireless communication link 1224 may be a bidirectional or unidirectional communication link, and may use one or more communication protocols.

The input module 1240c may receive sensor data from one or more vehicle sensors 1272c as well as electronic signals from other components, including the drive control components 1272a and the navigation components 1272b. The output module 1240d may communicate with or activate various components of the embedded vehicle computing system 1200, including the drive control components 1272a, the navigation components 1272b, and the sensor(s) 1272c.

The control unit 1240 may be coupled to the drive control components 1272a to control physical elements of the vehicle related to maneuvering and navigation of the vehicle, such as the engine, motors, throttles, steering elements, flight control elements, braking or deceleration elements, and the like. The drive control components 1272a may also include components that control other devices of the vehicle, including interior environment controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 1240 may be coupled to the navigation components 1272b, and may receive data from the navigation components 1272b and be configured to use such data to determine the present position and orientation of the vehicle, as well as an appropriate course toward a destination. The navigation components 1272b may include or be coupled to a global navigation satellite system (GNSS) receiver system (e.g., one or more Global Positioning System (GPS) receivers) enabling the embedded vehicle computing system 1200 to determine its current position using GNSS signals. Alternatively, or in addition, the navigation components 1272b may include radio navigation receivers for receiving navigation beacons or other signals from radio nodes, such as Wi-Fi access points, cellular network sites, radio station, remote computing devices, other vehicles, etc. Through control of the drive control elements 1272a, the processor 1240a may control the vehicle to navigate and maneuver. The processor 1240a, 1240g and/or the navigation components 1272b may be configured to communicate with a network element such as a server in a communication network (e.g., a core network 1232) via the wireless communication link 1222, 1226 to receive commands to control maneuvering, receive data useful in navigation, provide real-time position reports, etc.

The control unit 1240 may be coupled to one or more sensors 1272c. The sensor(s) 1272c may include the sensors 1242-1270 as described, and may the configured to provide a variety of data to the processor 1240a, 1240g.

While the control unit 1240 is described as including separate components, in some embodiments some or all of the components (e.g., the processor 1240a, the memory 1240b, the input module 1240c, the output module 1240d, and the radio module 1240e) may be integrated in a single device or module, such as an SoC processing device. Such an SoC processing device may be configured for use in vehicles and be configured, such as with processor-executable instructions executing in the processor 1240a, to perform operations of navigation and collision avoidance.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices, the example systems, devices, or methods discussed in the following paragraphs implemented by a computing device comprising a processing device and/or a PCIe controller configured with processing device-executable instructions to perform operations of the example systems, devices, or methods; a PCIe controller configured to perform operations of the example systems, devices, or methods; a computing device comprising a configured to perform operations of the example systems, devices, or methods; the example systems, devices, or methods discussed in the following paragraphs implemented by a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method performed by a Peripheral Component Interconnect Express (PCIe) device of a computing device for selecting a link configuration, including: selecting a predetermined PCIe link speed as a PCIe link speed for configuring a PCIe link based on a PCIe link configuration mode of a PCIe system of a plurality of PCIe link configuration modes of the PCIe system, in which the plurality of PCIe link configuration modes includes at least a first PCIe link configuration mode and a second PCIe link configuration mode; and selecting a PCIe link width of one lane for configuring the PCIe link.

Example 2. The method of example 1, in which the PCIe link configuration mode is the first PCIe link configuration mode, the method further including: comparing a reliability indicator of a lane of the PCIe link with a reliability threshold, in which selecting the predetermined PCIe link speed includes selecting a PCIe link speed level lower than a current PCIe link speed for the PCIe link in response to the reliability indicator of the lane of the PCIe link exceeding the reliability threshold.

Example 3. The method of either of examples 1 or 2, in which the PCIe link configuration mode is the first PCIe link configuration mode, the method further including: comparing a requested bandwidth and a configuration bandwidth of the PCIe link; and increasing the PCIe link width in response to the requested bandwidth exceeding the configuration bandwidth of the PCIe link.

Example 4. The method of example 3, further including comparing the PCIe link width with a PCIe link width threshold, in which increasing the PCIe link width in response to the requested bandwidth exceeding the configuration bandwidth of the PCIe link includes increasing the PCIe link width in response to the requested bandwidth exceeding the configuration bandwidth of the PCIe link and the PCIe link width falling short of the PCIe link width threshold.

Example 5. The method of any of examples 1-4, in which the PCIe link configuration mode is the second PCIe link configuration mode, and in which selecting the predetermined PCIe link speed includes selecting a maximum PCIe link speed for the PCIe link.

Example 6. The method of any of examples 1-5, in which the PCIe link configuration mode is the second PCIe link configuration mode, the method further including: comparing a requested bandwidth and a configuration bandwidth of the PCIe link; and increasing the PCIe link width in response to the requested bandwidth exceeding the configuration bandwidth of the PCIe link.

Example 7. The method of any of examples 1-6, in which the PCIe link configuration mode is the second PCIe link configuration mode, the method further including: comparing a requested bandwidth and a configuration bandwidth of the PCIe link; and decreasing the PCIe link speed in response to the configuration bandwidth of the PCIe link exceeding the requested bandwidth.

Example 8. The method of any of examples 1-8, further including: interpreting the PCIe link configuration mode; in response to interpreting the PCIe link configuration mode as the first PCIe link configuration mode, modifying a current PCIe link configuration having a current PCIe link width and a current PCIe link speed by increasing the PCIe link width relative to the current PCIe link width in response to a requested bandwidth exceeding a current bandwidth and decreasing the predetermined PCIe link speed relative to the current PCIe link speed in response to the current bandwidth exceeding the requested bandwidth; and in response to interpreting the PCIe link configuration mode as the second PCIe link configuration mode, modifying the current PCIe link configuration by increasing the predetermined PCIe link speed relative to the current PCIe link speed in response to the requested bandwidth exceeding the current bandwidth and decreasing the PCIe link width relative to the current PCIe link width in response to the current bandwidth exceeding the requested bandwidth.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method performed by a Peripheral Component Interconnect Express (PCIe) device of a computing device for selecting a PCIe link configuration, comprising:
    obtaining, by a link training status and state machine (LTSSM), PCIe link configuration mode data based on a plurality of operating states of a PCIe controller;
    selecting a predetermined PCIe link speed as a PCIe link speed for configuring a PCIe link based on a PCIe link configuration mode of a PCIe system of a plurality of PCIe link configuration modes of the PCIe system, wherein the plurality of PCIe link configuration modes comprise at least a first PCIe link configuration mode and a second PCIe link configuration mode, wherein the PCIe link configuration mode is selected from the plurality of PCIe link configuration modes based on the PCIe link configuration mode data; and
    selecting a PCIe link width of one lane for configuring the PCIe link.

2. The method of claim 1, wherein the PCIe link configuration mode is the first PCIe link configuration mode, the method further comprising:
    comparing a reliability indicator of a lane of the PCIe link with a reliability threshold,
    wherein selecting the predetermined PCIe link speed comprises selecting a PCIe link speed level lower than a current PCIe link speed for the PCIe link in response to the reliability indicator of the lane of the PCIe link exceeding the reliability threshold.

3. The method of claim 1, wherein the PCIe link configuration mode is the first PCIe link configuration mode, the method further comprising:
    comparing a requested bandwidth and a configuration bandwidth of the PCIe link; and
    increasing the PCIe link width in response to the requested bandwidth exceeding the configuration bandwidth of the PCIe link.

4. The method of claim 3, further comprising comparing the PCIe link width with a PCIe link width threshold, wherein increasing the PCIe link width in response to the requested bandwidth exceeding the configuration bandwidth of the PCIe link comprises increasing the PCIe link width in response to the requested bandwidth exceeding the configuration bandwidth of the PCIe link and the PCIe link width falling short of the PCIe link width threshold.

5. The method of claim 1, wherein the PCIe link configuration mode is the second PCIe link configuration mode, and wherein selecting the predetermined PCIe link speed comprises selecting a maximum PCIe link speed for the PCIe link.

6. The method of claim 1, wherein the PCIe link configuration mode is the second PCIe link configuration mode, the method further comprising:
    comparing a requested bandwidth and a configuration bandwidth of the PCIe link; and
    increasing the PCIe link width in response to the requested bandwidth exceeding the configuration bandwidth of the PCIe link.

7. The method of claim 1, wherein the PCIe link configuration mode is the second PCIe link configuration mode, the method further comprising:
    comparing a requested bandwidth and a configuration bandwidth of the PCIe link; and
    decreasing the PCIe link speed in response to the configuration bandwidth of the PCIe link exceeding the requested bandwidth.

8. The method of claim 1, further comprising:
    interpreting the PCIe link configuration mode;
    in response to interpreting the PCIe link configuration mode as the first PCIe link configuration mode, modifying a current PCIe link configuration having a current PCIe link width and a current PCIe link speed by increasing the PCIe link width relative to the current PCIe link width in response to a requested bandwidth exceeding a current bandwidth and decreasing the predetermined PCIe link speed relative to the current PCIe link speed in response to the current bandwidth exceeding the requested bandwidth; and
    in response to interpreting the PCIe link configuration mode as the second PCIe link configuration mode, modifying the current PCIe link configuration by increasing the predetermined PCIe link speed relative to the current PCIe link speed in response to the requested bandwidth exceeding the current bandwidth and decreasing the PCIe link width relative to the current PCIe link width in response to the current bandwidth exceeding the requested bandwidth.

9. A computing device, comprising:
    a Peripheral Component Interconnect Express (PCIe) device configured to:
        obtain, by a link training status and state machine (LTSSM), PCIe link configuration mode data based on a plurality of operating states of a PCIe controller;
        select a predetermined PCIe link speed as a PCIe link speed for configuring a PCIe link based on a PCIe link configuration mode of a PCIe system of a plurality of PCIe link configuration modes of the PCIe system, wherein the plurality of PCIe link configuration modes comprise at least a first PCIe link configuration mode and a second PCIe link configuration mode, wherein the PCIe link configuration mode is selected from the plurality of PCIe link configuration modes based on the PCIe link configuration mode data; and
        select a PCIe link width of one lane for configuring the PCIe link.

10. The computing device of claim 9, wherein the PCIe link configuration mode is the first PCIe link configuration mode, the PCIe device is further configured to:
    compare a reliability indicator of a lane of the PCIe link with a reliability threshold; and
    select the predetermined PCIe link speed having a PCIe link speed level lower than a current PCIe link speed for the PCIe link in response to the reliability indicator of the lane of the PCIe link exceeding the reliability threshold.

11. The computing device of claim 9, wherein the PCIe link configuration mode is the first PCIe link configuration mode, the PCIe device is further configured to:

compare a requested bandwidth and a configuration bandwidth of the PCIe link; and
increase the PCIe link width in response to the requested bandwidth exceeding the configuration bandwidth of the PCIe link.

12. The computing device of claim 11, wherein the PCIe device is further configured to:
compare the PCIe link width with a PCIe link width threshold; and
increase the PCIe link width in response to the requested bandwidth exceeding the configuration bandwidth of the PCIe link and the PCIe link width falling short of the PCIe link width threshold.

13. The computing device of claim 9, wherein the PCIe link configuration mode is the second PCIe link configuration mode, the PCIe device is further configured to select the predetermined PCIe link speed being a maximum PCIe link speed for the PCIe link.

14. The computing device of claim 9, wherein the PCIe link configuration mode is the second PCIe link configuration mode, the PCIe device is further configured to:
compare a requested bandwidth and a configuration bandwidth of the PCIe link; and
increase the PCIe link width in response to the requested bandwidth exceeding the configuration bandwidth of the PCIe link.

15. The computing device of claim 9, wherein the PCIe link configuration mode is the second PCIe link configuration mode, the PCIe device is further configured to:
compare a requested bandwidth and a configuration bandwidth of the PCIe link; and
decrease the PCIe link speed in response to the configuration bandwidth of the PCIe link exceeding the requested bandwidth.

16. The computing device of claim 9, wherein the PCIe device is further configured to:
interpret the PCIe link configuration mode;
in response to interpreting the PCIe link configuration mode as the first PCIe link configuration mode, modify a current PCIe link configuration having a current PCIe link width and a current PCIe link speed by increasing the PCIe link width relative to the current PCIe link width in response to a requested bandwidth exceeding a current bandwidth and decreasing the predetermined PCIe link speed relative to the current PCIe link speed in response to the current bandwidth exceeding the requested bandwidth; and
in response to interpreting the PCIe link configuration mode as the second PCIe link configuration mode, modify the current PCIe link configuration by increasing the predetermined PCIe link speed relative to the current PCIe link speed in response to the requested bandwidth exceeding the current bandwidth and decreasing the PCIe link width relative to the current PCIe link width in response to the current bandwidth exceeding the requested bandwidth.

17. A computing device, comprising:
means for obtaining, by a link training status and state machine (LTSSM), PCIe link configuration mode data based on a plurality of operating states of a PCIe controller;
means for selecting a predetermined Peripheral Component Interconnect Express (PCIe) link speed as a PCIe link speed for configuring a PCIe link based on a PCIe link configuration mode of a PCIe system of a plurality of PCIe link configuration modes of the PCIe system, wherein the plurality of PCIe link configuration modes comprise at least a first PCIe link configuration mode and a second PCIe link configuration mode, wherein the PCIe link configuration mode is selected from the plurality of PCIe link configuration modes based on the PCIe link configuration mode data; and
means for selecting a PCIe link width of one lane for configuring the PCIe link.

18. The computing device of claim 17, wherein the PCIe link configuration mode is the first PCIe link configuration mode, the computing device further comprising:
means for comparing a reliability indicator of a lane of the PCIe link with a reliability threshold,
wherein means for selecting the predetermined PCIe link speed comprises means for selecting a PCIe link speed level lower than a current PCIe link speed for the PCIe link in response to the reliability indicator of the lane of the PCIe link exceeding the reliability threshold.

19. The computing device of claim 17, wherein the PCIe link configuration mode is the first PCIe link configuration mode, the computing device further comprising:
means for comparing a requested bandwidth and a configuration bandwidth of the PCIe link; and
means for increasing the PCIe link width in response to the requested bandwidth exceeding the configuration bandwidth of the PCIe link.

20. The computing device of claim 19, further comprising means for comparing the PCIe link width with a PCIe link width threshold, wherein means for increasing the PCIe link width in response to the requested bandwidth exceeding the configuration bandwidth of the PCIe link comprises means for increasing the PCIe link width in response to the requested bandwidth exceeding the configuration bandwidth of the PCIe link and the PCIe link width falling short of the PCIe link width threshold.

21. The computing device of claim 17, wherein the PCIe link configuration mode is the second PCIe link configuration mode, and wherein means for selecting the predetermined PCIe link speed comprises means for selecting a maximum PCIe link speed for the PCIe link.

22. The computing device of claim 17, wherein the PCIe link configuration mode is the second PCIe link configuration mode, the computing device further comprising:
means for comparing a requested bandwidth and a configuration bandwidth of the PCIe link; and
means for increasing the PCIe link width in response to the requested bandwidth exceeding the configuration bandwidth of the PCIe link.

23. The computing device of claim 17, wherein the PCIe link configuration mode is the second PCIe link configuration mode, the computing device further comprising:
means for comparing a requested bandwidth and a configuration bandwidth of the PCIe link; and
means for decreasing the PCIe link speed in response to the configuration bandwidth of the PCIe link exceeding the requested bandwidth.

24. The computing device of claim 17, further comprising:
means for interpreting the PCIe link configuration mode;
in response to interpreting the PCIe link configuration mode as the first PCIe link configuration mode, means for modifying a current PCIe link configuration having a current PCIe link width and a current PCIe link speed by increasing the PCIe link width relative to the current PCIe link width in response to a requested bandwidth exceeding a current bandwidth and decreasing the predetermined PCIe link speed relative to the current PCIe link speed in response to the current bandwidth exceeding the requested bandwidth; and in response to interpreting the PCIe link configuration mode as the second PCIe link configuration mode, means for modifying the current PCIe link configuration by increasing the predetermined PCIe link speed relative to the current PCIe link speed in response to the requested bandwidth exceeding the current bandwidth and decreasing the PCIe link width relative to the current PCIe link width in response to the current bandwidth exceeding the requested bandwidth.

25. A Peripheral Component Interconnect Express (PCIe) device configured to:
  obtain, by a link training status and state machine (LT-SSM), PCIe link configuration mode data based on a plurality of operating states of a PCIe controller;
  select a predetermined PCIe link speed as a PCIe link speed for configuring a PCIe link based on a PCIe link configuration mode of a PCIe system of a plurality of PCIe link configuration modes of the PCIe system, wherein the plurality of PCIe link configuration modes comprise at least a first PCIe link configuration mode and a second PCIe link configuration mode, wherein the PCIe link configuration mode is selected from the plurality of PCIe link configuration modes based on the PCIe link configuration mode data; and
  select a PCIe link width of one lane for configuring the PCIe link.

26. The PCIe device of claim 25, wherein the PCIe link configuration mode is the first PCIe link configuration mode, the PCIe device is further configured to:
  compare a reliability indicator of a lane of the PCIe link with a reliability threshold;
  select the predetermined PCIe link speed having a PCIe link speed level lower than a current PCIe link speed for the PCIe link in response to the reliability indicator of the lane of the PCIe link exceeding the reliability threshold;
  compare a requested bandwidth and a configuration bandwidth of the PCIe link; and
  increase the PCIe link width in response to the requested bandwidth exceeding the configuration bandwidth of the PCIe link.

27. The PCIe device of claim 26, wherein the PCIe device is further configured to:
  compare the PCIe link width with a PCIe link width threshold; and
  increase the PCIe link width in response to the requested bandwidth exceeding the configuration bandwidth of the PCIe link and the PCIe link width falling short of the PCIe link width threshold.

28. The PCIe device of claim 25, wherein the PCIe link configuration mode is the second PCIe link configuration mode, the PCIe device is further configured to select the predetermined PCIe link speed being a maximum PCIe link speed for the PCIe link.

29. The PCIe device of claim 25, wherein:
  the PCIe link configuration mode is the second PCIe link configuration mode; and
  the PCIe device is further configured to:
    compare a requested bandwidth and a configuration bandwidth of the PCIe link;
    increase the PCIe link width in response to the requested bandwidth exceeding the configuration bandwidth of the PCIe link; and
    decrease the PCIe link speed in response to the configuration bandwidth of the PCIe link exceeding the requested bandwidth.

30. The PCIe device of claim 25, wherein the PCIe device is further configured to:
  interpret the PCIe link configuration mode;
  in response to interpreting the PCIe link configuration mode as the first PCIe link configuration mode, modify a current PCIe link configuration having a current PCIe link width and a current PCIe link speed by increasing the PCIe link width relative to the current PCIe link width in response to a requested bandwidth exceeding a current bandwidth and decreasing the predetermined PCIe link speed relative to the current PCIe link speed in response to the current bandwidth exceeding the requested bandwidth; and
  in response to interpreting the PCIe link configuration mode as the second PCIe link configuration mode, modify the current PCIe link configuration by increasing the predetermined PCIe link speed relative to the current PCIe link speed in response to the requested bandwidth exceeding the current bandwidth and decreasing the PCIe link width relative to the current PCIe link width in response to the current bandwidth exceeding the requested bandwidth.

* * * * *